(12) United States Patent
Zhang et al.

(10) Patent No.: US 8,838,110 B2
(45) Date of Patent: Sep. 16, 2014

(54) SYSTEM AND METHOD FOR USER EQUIPMENT MOBILITY SUPPORT IN A HETEROGENEOUS NETWORK

(75) Inventors: Hang Zhang, Nepean (CA); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 42 days.

(21) Appl. No.: 13/311,186

(22) Filed: Dec. 5, 2011

(65) Prior Publication Data

US 2012/0142352 A1 Jun. 7, 2012

Related U.S. Application Data

(60) Provisional application No. 61/419,707, filed on Dec. 3, 2010.

(51) Int. Cl.
*H04W 36/30* (2009.01)

(52) U.S. Cl.
USPC ............ 455/436; 455/444; 455/522; 370/331

(58) Field of Classification Search
USPC .................. 455/436–438, 7, 444, 452.1, 522; 370/254, 331
See application file for complete search history.

(56) References Cited

U.S. PATENT DOCUMENTS

| | | | |
|---|---|---|---|
| 2007/0073929 A1 | 3/2007 | Takayama et al. | |
| 2008/0305799 A1 | 12/2008 | Zuniga et al. | |
| 2009/0029645 A1 | 1/2009 | Leroudier | |
| 2009/0291690 A1 | 11/2009 | Guvenc et al. | |
| 2010/0142477 A1 | 6/2010 | Yokota | |
| 2010/0197298 A1* | 8/2010 | So et al. ................. | 455/424 |
| 2011/0085471 A1 | 4/2011 | Zhang | |
| 2011/0103347 A1* | 5/2011 | Dimou ..................... | 370/331 |
| 2012/0113816 A1* | 5/2012 | Bhattad et al. .............. | 370/246 |

FOREIGN PATENT DOCUMENTS

| | | |
|---|---|---|
| WO | 2009107950 A2 | 9/2009 |
| WO | 2011040748 A2 | 4/2011 |

OTHER PUBLICATIONS

Gambetti, C., "Wireless Heterogeneous Networks," University of Bologna, Department of Electronics Computer Science and Systems, Information Technolgoy and Telecomunications, XIX Cycle, Mar. 2007, 138 pages.

Paik, E. K., et al., "Seamless Mobility Support for Mobile Networks on Vehicles across Heterogeneous Wireless Access Networks," Vehicular Technology Conference, 57th IEEE Semiannual, vol. 4, Apr. 2003, pp. 2437-2441.

Sargento, S., et al., "Mobility through Heterogeneous Networks in a 4G Environment," 16th IST Mobile and Wireless Communications Summit, 2007, 17 pages.

(Continued)

*Primary Examiner* — Chuong A Ngo
(74) *Attorney, Agent, or Firm* — Slater & Matsil, L.L.P

(57) ABSTRACT

A method for supporting mobility in a user equipment by a macro cell as the user equipment moves into a coverage area of a low power node includes receiving a measurement report from the user equipment, and selecting a technique for supporting mobility according to the measurement report, and a support factor of the user equipment and of a communications system where the user equipment is operating. The method also includes operating the macro cell and the low power node according to the selected technique.

35 Claims, 16 Drawing Sheets

(56) References Cited

OTHER PUBLICATIONS

International Search Report received in Patent Cooperation Treaty Application No. PCT/US2011/63305, mailed Mar. 2, 2012, 2 pages.
Written Opinion of the International Searching Authority received in Patent Cooperation Treaty Application No. PCT/US2011/63305, mailed Mar. 2, 2012, 6 pages.
Huawei, NEC, "Handover of Single IMS Session from HNB to Macro CS—Information Flow," TD S2-092091, 3GPP TSG SA WG2 Meeting #72, Mar. 30-Apr. 3, 2009, Hangzhou, China, 2 pages.
Extended European Search Report received in Application No. 11845363.8 dated Oct. 22, 2013, 15 pages.

* cited by examiner

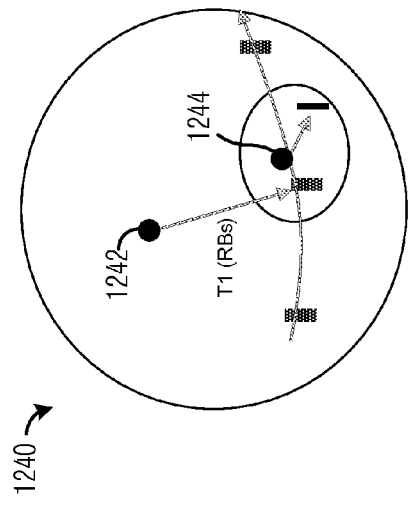
Fig. 12c
Fig. 12e
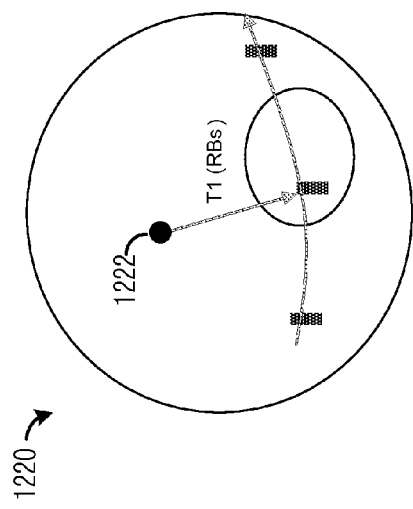
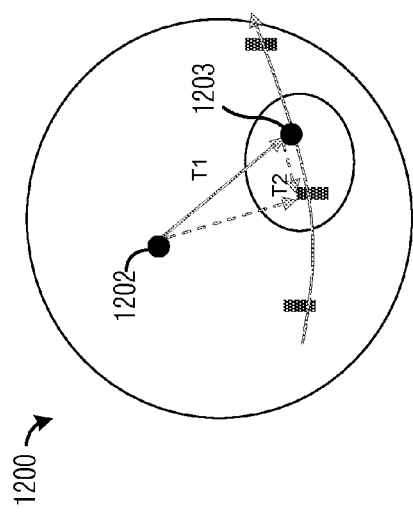
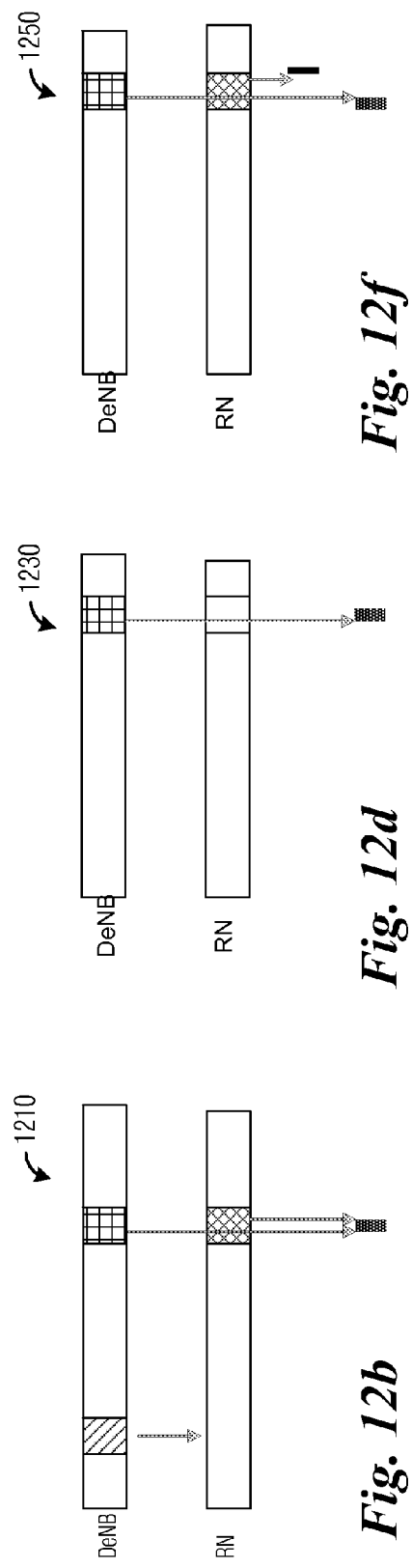
Fig. 12b
Fig. 12d
Fig. 12f : # SYSTEM AND METHOD FOR USER EQUIPMENT MOBILITY SUPPORT IN A HETEROGENEOUS NETWORK This application claims the benefit of U.S. Provisional Application No. 61/419,707, filed on Dec. 3, 2010, entitled "System and Method for UE Mobility Support in Hetnet," which application is hereby incorporated herein by reference.

TECHNICAL FIELD

The present invention relates generally to digital communications, and more particularly to a system and method for user equipment (UE) mobility support in a heterogeneous network (Hetnet).

BACKGROUND

Generally, a heterogeneous network (Hetnet) is a network containing access nodes of differing power and/or coverage size. Access nodes may often be referred to as communications controllers, cells, base stations, NodeBs, evolved NodeBs, and the like. As an example, access nodes in a Hetnet may include a system of macro cells that operate at high power levels, a system of low power nodes, such as pico cells, radio heads, and relay nodes, which operate at reduced power levels. The macro cells and the low power nodes may be part of a planned network operated by one or more operators of the wireless communications system. Access nodes in a Hetnet may also include a system of ad-hoc nodes, such as femto cells, Home evolved NodeBs (HeNBs), and so on. The ad-hoc network may be user deployed access nodes that a user may add in order to improve performance in a small area, such as a home, an apartment building, a business, or so forth. Collectively, the access nodes (macro cells, low power cells, ad-hoc nodes, and the like) may be referred to as nodes without loss of generality.

A Hetnet may be considered to be a multi-layer communications system, with the macro cells making up a first layer, and the low power cells making up a second layer. A Hetnet with multiple relay nodes may offer the following benefits: lower power transmission (less power consumption and less electromagnetic pollution), enhanced coverage and capacity at low cost, and flexible deployments.

SUMMARY OF THE INVENTION

Example embodiments of the present invention which provide a system and method for UE mobility support in a Hetnet.

In accordance with an example embodiment of the present invention, a method for supporting mobility in a user equipment by a macro cell as the user equipment moves into a coverage area of a low power node is provided. The method includes receiving a measurement report from the user equipment, and selecting a technique for supporting mobility according to the measurement report, and a support factor of the user equipment and of a communications system where the user equipment is operating. The method also includes operating the macro cell and the low power node according to the selected technique.

In accordance with another example embodiment of the present invention, a method for operating a first access node is provided. The method includes transmitting a reservation for a network resource intended for use by a user equipment served by the first access node to a second access node operating in a coverage area of the first access node, the reservation includes an indication of the network resource and a specified use of the network resource by the second access node. The method also includes receiving a confirmation of the reservation from the second access node, and transmitting information to the user equipment in the network resource.

In accordance with another example embodiment of the present invention, a method for operating a first access node is provided. The method includes receiving a measurement report from a user equipment served by the first access node, where the user equipment operating in a coverage area of the first access node. The method also includes initiating a handover for the user equipment to a second access node operating in the coverage area of the first access node, completing the handover, receiving information intended for the user equipment, and transmitting the received information to the second access node.

In accordance with another example embodiment of the present invention, a method for operating a first access node is provided. The method includes participating in a handover for a user equipment from a second access node, where the first access node operating in a coverage area of the second access node. The method also includes completing the handover, receiving information intended for the user equipment from the second access node, and transmitting the received information to the user equipment.

In accordance with another example embodiment of the present invention, an access node is provided. The access node includes a transmitter, and a receiver coupled to the transmitter. The transmitter transmits a reservation for a network resource intended for use by a user equipment served by the access node to a second access node operating in a coverage area of the access node, the reservation includes an indication of the network resource and a specified use of the network resource by the second access node, and transmits information to the user equipment in the network resource. The receiver receives a confirmation of the reservation from the second access node.

In accordance with another example embodiment of the present invention, an access node is provided. The access node includes a processor, a receiver coupled to the processor, and a transmitter coupled to the processor. The processor participates in a handover for a user equipment from a second access node, where the access node is operating in a coverage area of the second access node, and completes the handover. The receiver receives information intended for the user equipment from the second access node. The transmitter transmits the received information to the user equipment.

One advantage of an embodiment is that in a handover (HO) free environment, UE mobility is supported by reducing interference to the UE. Reduced interference eliminates or reduces a need for HOs, which reduces signaling overhead and helps to improve overall communications system performance.

A further advantage of an embodiment is that in a HO environment, communications path switches in a core network resulting from HOs are reduced or eliminated, which helps to reduce overhead in the core network and helps to improve overall communications system performance.

BRIEF DESCRIPTION OF THE DRAWINGS

For a more complete understanding of the present invention, and the advantages thereof, reference is now made to the following descriptions taken in conjunction with the accompanying drawing, in which:

FIGS. 12a and 12b illustrate example communications system wherein a RN is operating as a LPN and is operating in a JT mode with a macro cell and a transmission diagram therefore according to example embodiments described herein;

FIGS. 12c and 12d illustrate example communications system wherein a RN is operating as a LPN and is not transmitting in a reserved network resource to reduce interference to a UE and a transmission diagram therefore according to example embodiments described herein;

FIGS. 12e and 12f illustrate example communications system wherein a RN is operating as a LPN and is operating in a CB or CS mode with a macro cell and a transmission diagram therefore according to example embodiments described herein;

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to providing support for User Equipment (UE) mobility in a Hetnet. For example, in a handover (HO) free mode, as a UE moves into a coverage area of a low power node (LPN) while it is still experiencing strong macro cell coverage, the LPN is configured to reduce interference to the UE, for example, by not transmitting (or transmitting at low power levels) in reserved resources. Additionally, the LPN and the macro cell may operate in a joint manner, such as through joint processing, joint transmission, coordinated beamforming, coordinated scheduling, during the reserved resources to reduce interference to the UE.

As another example, in an enhanced HO mode, handovers can be made transparent to the core network to reduce switching overhead and other impact to the core network. For example, as the UE moves into a coverage area of a LPN while it is experiencing low macro cell coverage, a handover from the macro cell to the LPN is performed. However, the core network is not informed about the handover unless the UE is still operating with the LPN after a threshold (e.g., a timer elapsing) is met. The macro cell forwards information to the UE through the LPN. In yet another example, a subnet architecture is utilized with the macro cell operating as a gateway for LPNs operating within its coverage area or near its coverage area. Hence, handovers occurring between the macro cell and any of the LPNs in its subnet are transparent to the core network. As another example, a technique for providing support for UE mobility is selected based on measurement reports and support factors.

The present invention will be described with respect to example embodiments in a specific context, namely a Hetnet comprising a macro cell network (for example, a Third Generation Partnership Project (3GPP) Long Term Evolution (LTE) technical standard compliant communications system) and a low power node network. The invention may also be applied, however, to Hetnets comprising other macro cell networks, such as WiMAX, IEEE 802.16m, and so forth, technical standard compliant communications systems, operating with low power node networks.

Figure 1:
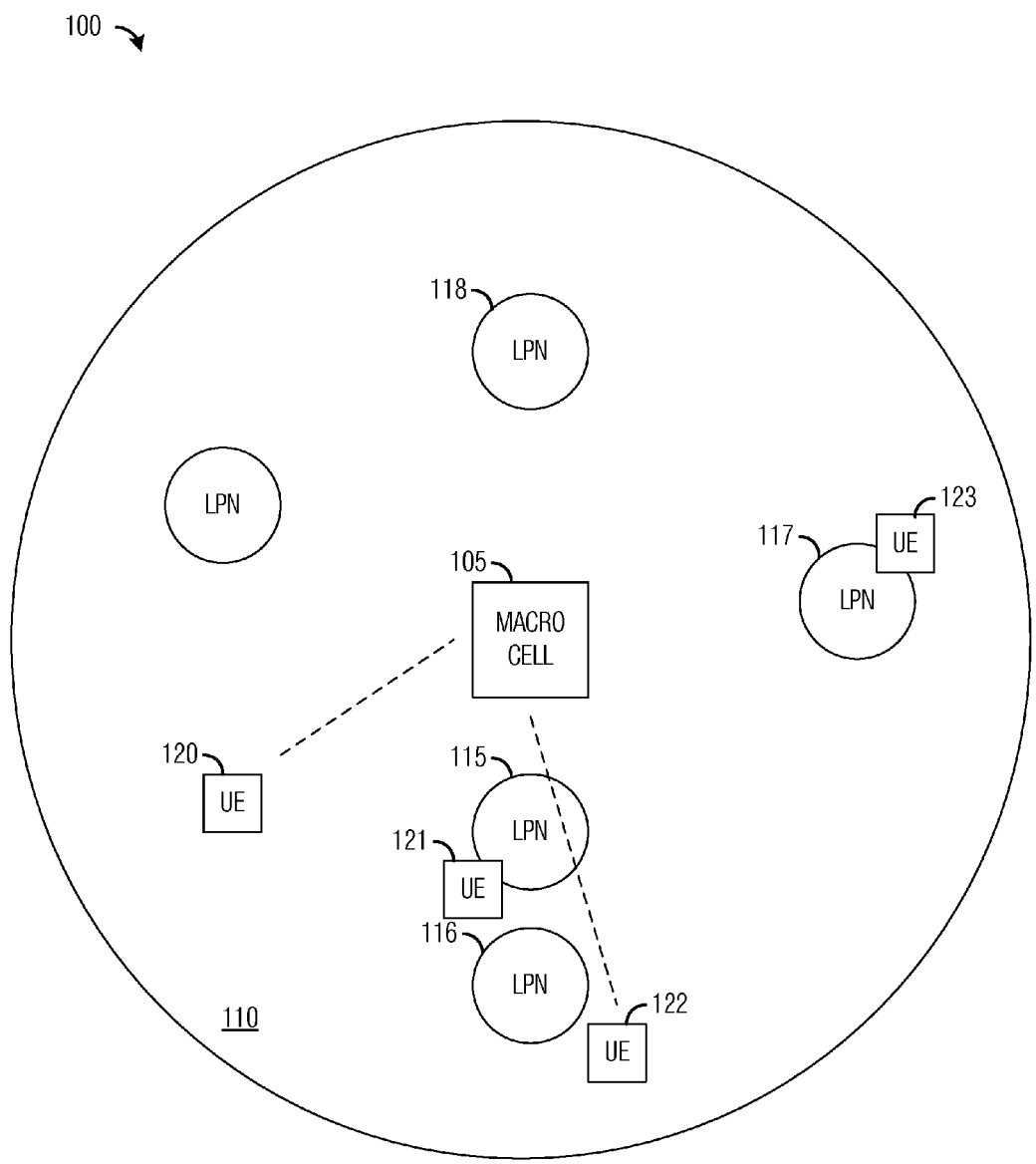
FIG. 1 illustrates an example communications system according to example embodiments described herein.

FIG. 1 illustrates a communications system 100. Communications system 100 includes a macro cell 105 with a coverage area 110. Within coverage area 110 of macro cell 105 there are a plurality of LPNs, such as LPN 115, LPN 116, LPN 117, and LPN 118. Operating within coverage area 110 is a plurality of UEs (also commonly referred to as mobile stations, terminals, users, mobiles, and the like), such as UE 120, UE 121, UE 122, and UE 123. Some of the UEs are served by macro cell 105, such as UE 120 and UE 122, while some UEs are served by a LPN, such as UE 123 that is served by LPN 117. Some UEs are served by both macro cell 105 and a LPN, such as UE 121 that is served by macro cell 105 and LPN 115. Communications system 100 is commonly referred to as a Hetnet.

While it is understood that communications systems may employ multiple macro cells and LPNs capable of communicating with a number of UEs, only one macro cell, five LPNs, and four UEs are illustrated for simplicity.

In a Hetnet which include macro cells and LPNs, the cell-splitting concept is utilized to enhance system capacity and coverage. In such a system, the coverage area of a macro cell usually overlaps with those relatively smaller coverage areas of LPNs, such as shown in FIG. 1. In a co-channel Hetnet where all the nodes utilize the same carrier band, a moving UE may experience more frequent HO within the coverage area of the macro cell. Although the Hetnet is not targeting to serve the high mobility UE, but the movement of the UE into the coverage of low power node generally cannot be avoided.

Intuitively, it is possible to avoid to handover a macro cell served UE (MUE), moving into the coverage area of a LPN that is operating within the coverage area of the macro cell (referred to as intra macro cell handover free or intra-macro HO free). However when the MUE moves into the coverage area of a LPN, the UE may experience strong interference. Therefore, a solution is needed to help the interference environment of the MUE. Another intuitive technique that may be used is to simply perform a HO as a normal UE HO in cellular systems. However, such conventional HO procedures may incur significantly increased interactions between Radio Access Network (RAN) and a core network than in a typical homogeneous network, due to a frequency of such HO events in a heterogeneous environment.

Figure 2:
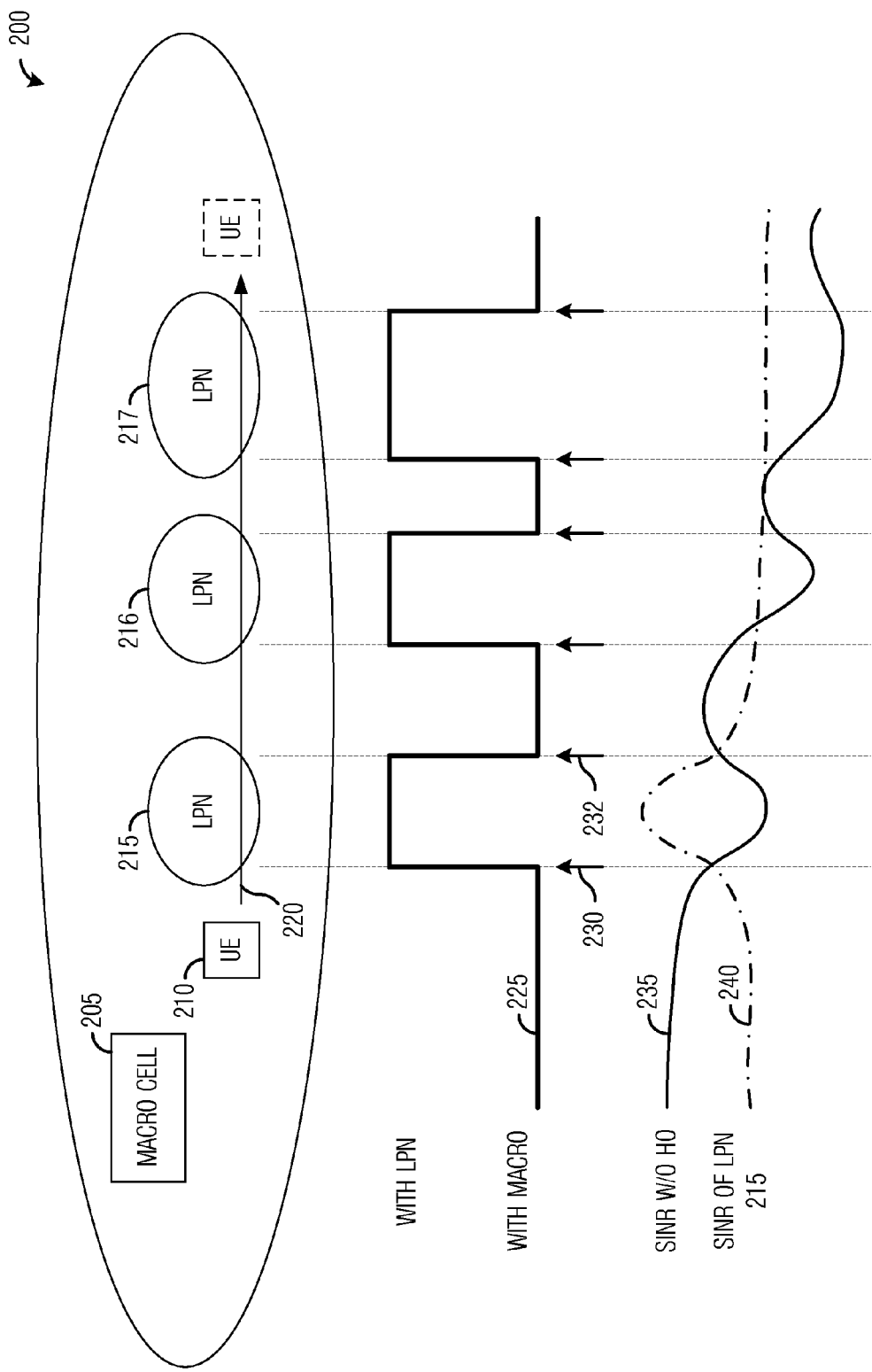
FIG. 2 illustrates an example communications system highlighting UE mobility according to example embodiments described herein.

FIG. 2 illustrates a communications system 200 highlighting UE mobility. Communications system 200 includes a macro cell 205 and a UE 210 served by macro cell 205. However, UE 210 is a mobile UE and due to its mobility, UE 210 may pass through coverage areas of a plurality of LPNs, such as LPN 215, LPN 216, and LPN 217, as UE 210 moves along a path 220.

If a normal UE HO technique was used to provide support for UE 210 as it moves about the coverage area of macro cell 205, then UE 210 will participate in a number of HOs between macro cell 205 and the LPNs. As an example, a trace 225 illustrates a serving node for UE 210 as it moves along path 220. Initially, UE 210 is served by macro cell 205, when as it moves into the coverage area of LPN 215, UE 210 participates in a HO between macro cell 205 and LPN 215 and is served by LPN 215 (at points 230 and 232, respectively). Then, as UE 210 continues to move along path 220, it switches from being served by LPN 215 to macro cell 205 to LPN 216 to macro cell 205 to LPN 217 and back to macro cell 205. A trace 235 illustrates a typical signal to interference plus noise ratio (SINR) due to macro cell 205 experienced by UE 210 as it moves along path 220 if HO is avoided. A trace 240 illustrates a typical SINR due to LPN 215 experienced by UE 210 as it moves along path 220. Traces 235 and 240 are meant to be illustrative examples and are not intended to be representative of actual SINR values. Similar traces illustrating typical SINR due to LPN 216 and LPN 217 are omitted. It is noted that trace 235 displays wide fluctuation, which causes significant performance degradation. The SINR fluctuations are generally worse than in a homogeneous network due to strong co-channel interference from the LPNs.

According to an example embodiment, a technique that can be used to support UE mobility in a Hetnet is to prevent intra-macro HOs and hence, its associated over-the-air signaling. Generally, the technique is used in situations where macro cell coverage is strong enough for the UE. According to an example embodiment, the macro cell informs the LPN or LPNs regarding network resource(s) that the LPN should reserve for UE traffic.

According to an alternative example embodiment, the macro cell may be informed regarding network resource(s) that are reserved for UE traffic. As an example, the LPN can reserve network resource(s) and inform the macro cell about the reserved network resource(s). According to an alternative embodiment, a management platform (e.g., an entity operating in the communications system, such as an Operations, Administration, and Maintenance (OA&M) entity) can reserve network resource(s) and inform the macro cell and the LPN about the reserved network resource(s).

The LPN does not transmit data during the reserved network resource(s), however reference signals, such as common reference signals (CRS) and the like, may still be transmitted. The reserved network resource(s) may include both control channels and data channels, as well as downlink (DL) and uplink (UL). The reserved network resource(s) may be as small as one or two resource blocks to as large as one or more subframes.

Although the discussion focuses on the transmission of data, the example embodiments presented herein are operable for the transmission of control information as well. In general, the term information is used to refer to either data or control information or both. Therefore, the discussion of the transmission of data should not be construed as being limiting to either the scope or the spirit of the example embodiments.

Figure 3A:
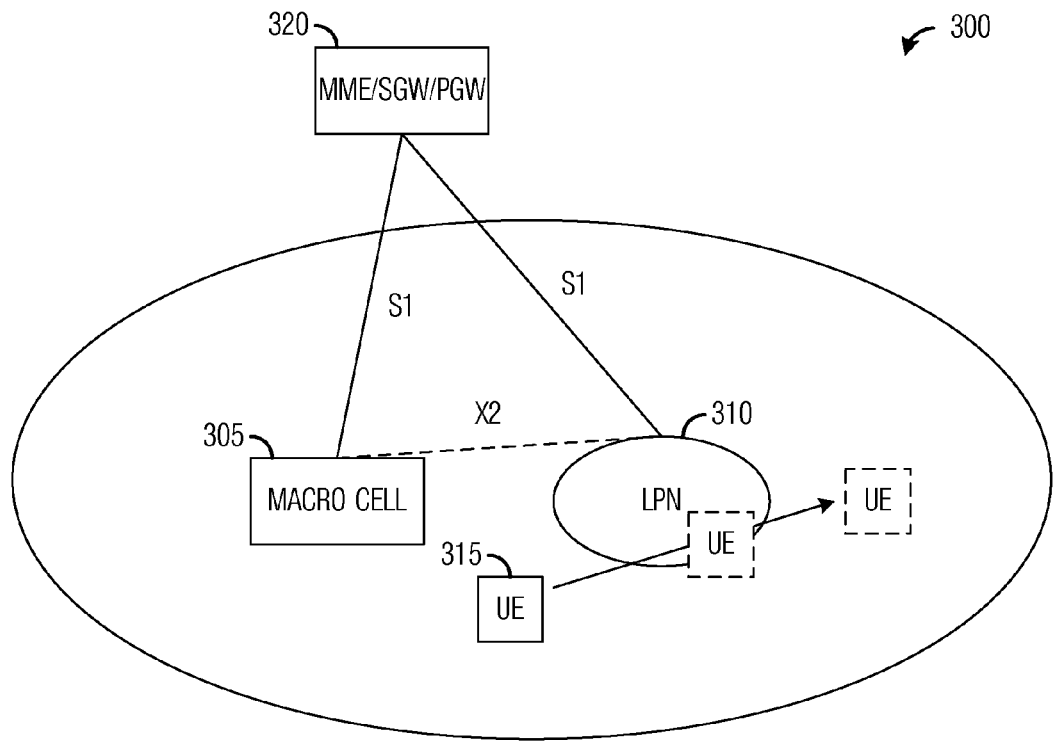
FIG. 3a illustrates an example communications system where intra-macro HOs are prevented to reduce interference to support UE mobility according to example embodiments described herein.

FIG. 3a illustrates a communications system 300 where intra-macro HOs are prevented to reduce interference to support UE mobility. Communications system 300 includes a macro cell 305 and a LPN 310. Communications system 300 also includes a UE 315 that is initially served by macro cell 305. Communications system 300 further includes a mobility management entity (MME)/serving gateway (SGW)/packet gateway (PGW) 320 that is shown as a single unit (MME/SGW/PGW). Although shown as a single unit, MME/SGW/PGW 320 may be implemented as multiple units. MME/SGW/PGW 320 may control mobility of UE, provide services to UE, provide an entry point and/or an exit point for packets, and the like. Beyond MME/SGW/PGW 320 is a remainder of a core network. MME/SGW/PGW 320 is coupled to macro cell 305 and LPN 310 by a wired S1 interface, while macro cell 305 and LPN 310 are connected via a wired X2 interface.

Initially, UE 315 is served by macro cell 305. However, as UE 315 moves, it enters the coverage area of LPN 310. If intra-macro HOs are not prevented, UE 315 may participate in a HO to become served by LPN 310. However, since intra-macro HOs are prevented, UE 315 remains served by macro cell 305. But as UE 315 remains in the coverage area of LPN 310, transmissions from LPN 310 (and in a communications system configured for Time Division Duplex (TDD) operation, from transmissions from other UEs served by LPN 310) can cause interference to UE 315. It is noted that in a communications system configured for Frequency Division Duplex (FDD) operation, transmissions from other UEs served by LPN 310 generally do not cause interference to UE 315.

In order to reduce or prevent interference to UE 315, macro cell 305 informs LPN 310 to not transmit during a reserved network resource(s) or is informed about a reserved network resource(s) by LPN 310 or a management platform responsible for reserving network resources. Furthermore, LPN 310 may prevent its other served UE from transmitting during the reserved network resource(s). Hence, during the reserved network resource(s), interference to UE 315 from LPN 310 is reduced or eliminated.

Figure 3B:
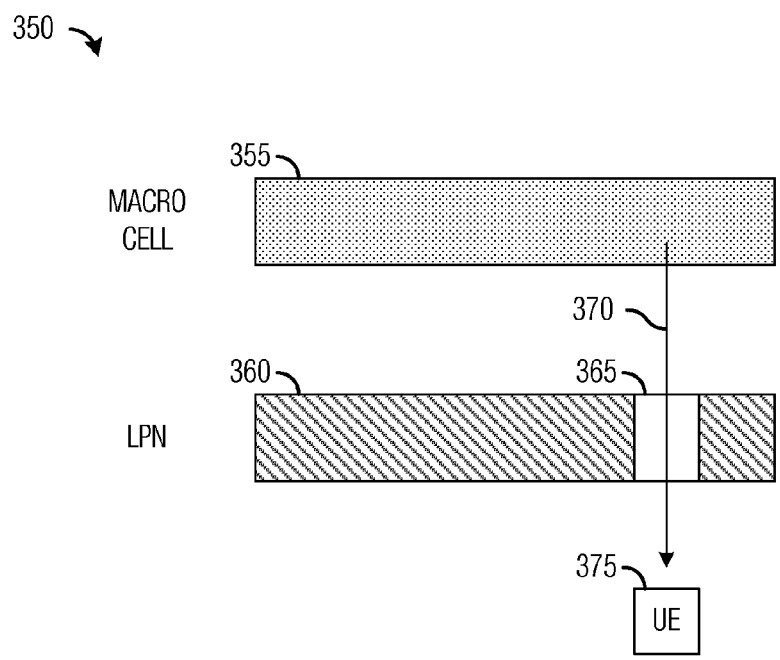
FIG. 3b illustrates an example transmission diagram associated with FIG. 3a according to example embodiments described herein.

FIG. 3b illustrates a transmission diagram 350. Transmission diagram 350 displays transmissions from macro cell 305 (shown as transmission 355) and LPN 310 (shown as transmission 360). As shown in FIG. 3b, transmission 360 (transmission from LPN 310) has a no information transmit period (or a low transmit power transmit period) 365 corresponding to a reserved network resource(s) wherein there is no data transmission (as discussed previously, LPN 310 can transmit reference signals such as CRS). During no information transmit period (or a low transmit power transmit period) 365, macro cell 305 can transmit to UE 375 without much interference from transmissions from LPN 310.

Figures 4A, 4B:
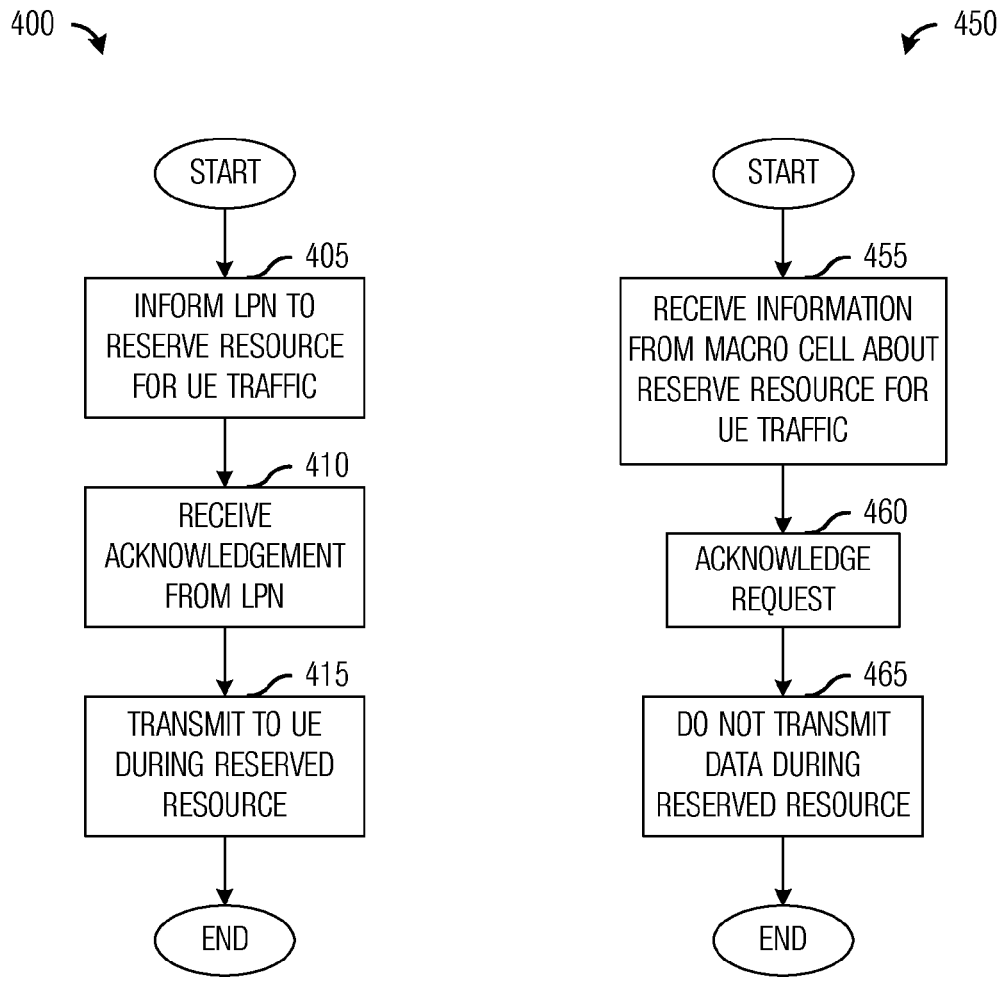
FIG. 4a illustrates an example flow diagram of operations in a macro cell as the macro cell participates in interference free operation to support UE mobility according to example embodiments described herein.
FIG. 4b illustrates an example flow diagram of operations in a LPN as the LPN participates in interference free operation to support UE mobility according to example embodiments described herein.

FIG. 4a illustrates a flow diagram of operations 400 in a macro cell as the macro cell participates in interference free operation to support UE mobility. Operations 400 may be indicative of operations occurring in a macro cell, such as macro cell 305, as the macro cell participates in interference free operation to support UE mobility.

Operations 400 begin with the macro cell informing a LPN about a reserved network resource(s) that is reserved for UE traffic or receiving information about a reserved network resource(s) from the LPN or a management platform responsible for reserving network resources (block 405). According to an example embodiment, the macro cell sends to the LPN information about reserved network resource(s). According to an alternative example embodiment, the macro cell receives information about the reserved network resource(s) from the LPN or the management platform. The information includes, but is not limited to: resource block(s) corresponding to the reserved network resource, a validity duration for the reservation of the reserved network resource(s), an allowed transmit power for the LPN if transmissions (e.g., at low power levels) are permitted, and the like.

The macro cell receives an acknowledgement from the LPN if the macro cell was responsible for reserving the network resource(s) (block 410). The acknowledgement informs the macro cell if the LPN agrees to the reservation of the reserved network resource(s). The acknowledgement may also include information from the LPN to the macro cell. The information from the LPN includes, but is not limited to: a confirmation of the resource block(s) corresponding to the reserved network resource, a duration for the reservation of the reserved network resource(s), a transmit power (e.g., 0 or a low power). According to an example embodiment, the macro cell and the LPN may exchange multiple messages to negotiate an agreeable reservation of the reserved network resource(s). According to an example embodiment, if the LPN is operating in a slave configuration for the macro cell, then the LPN may not have an option of agreeing or disagreeing to the reservation of the reserved network resource(s). The macro cell transmits to the UE during the reserved network resource(s) (block 415).

FIG. 4b illustrates a flow diagram of operations 450 in a LPN as the LPN participates in interference free operation to support UE mobility. Operations 450 may be indicative of operations occurring in a LPN, such as LPN 310, as the LPN participates in interference free operation to support UE mobility.

Operations 450 begin with the LPN receiving a transmission from a macro cell or a management platform containing information about a reserved network resource(s) for UE traffic or the LPN makes a reservation for the reserved network resource(s) (block 455). The information includes, but is not limited to: resource block(s) corresponding to the reserved network resource, a duration for the reservation of the reserved network resource(s), an allowed transmit power for the LPN if transmissions (e.g., at low power levels) are permitted, and the like.

If the macro cell made the reservation for the reserved network resource(s), the LPN acknowledges the information about the reserved network resource(s) (block 460). The acknowledgement may also include information from the LPN to the macro cell. The information from the LPN includes, but is not limited to: a confirmation of the resource block(s) corresponding to the reserved network resource, a duration for the reservation of the reserved network resource(s), a transmit power (e.g., 0 or a low power). According to an example embodiment, the macro cell and the LPN may exchange multiple messages to negotiate an agreeable reservation of the reserved network resource(s). While, if the management platform made the reservation for the reserved network resource(s), the LPN may acknowledge the management platform rather than the macro cell. However, if the LPN made the reservation for the reserved network resource(s), the LPN may expect an acknowledgement from the macro cell. The LPN does not transmit (or transmits at the agreed to low level) data during the reserved network resource(s) (block 465).

Figure 5A:
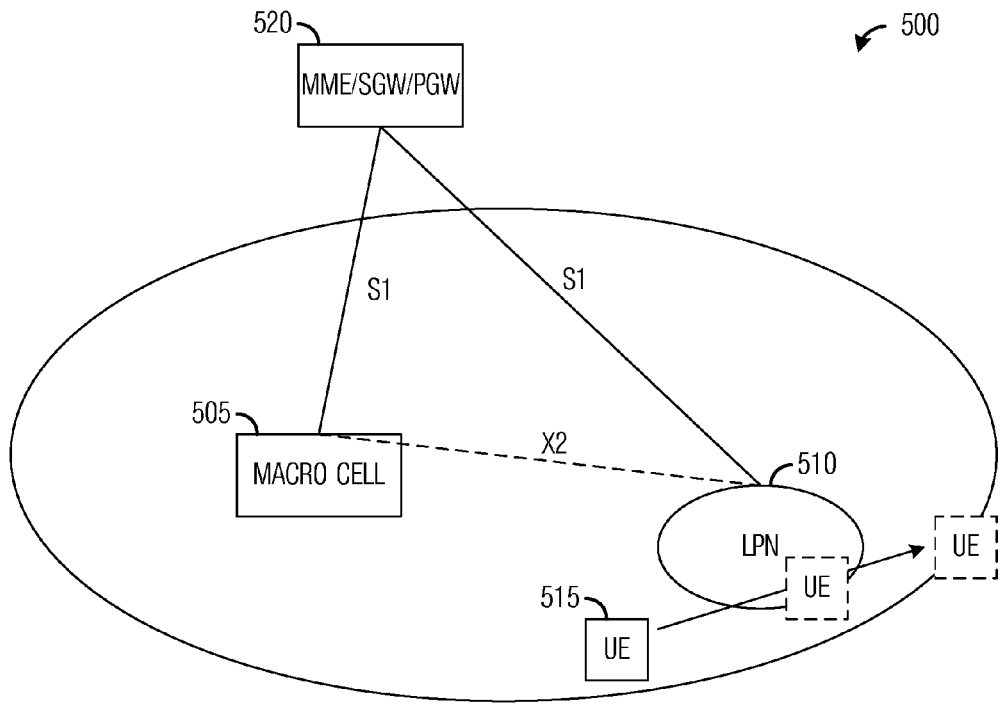
FIG. 5a illustrates an example communications system where intra-macro HOs are prevented and joint transmission (JT), joint processing (JP), coordinated beamforming (CB), coordinated scheduling (CS), coordinated multiple point (CoMP), and the like are used to reduce interference and to support UE mobility according to example embodiments described herein.

FIG. 5a illustrates a communications system 500 where intra-macro HOs are prevented and joint transmission (JT), joint processing (JP), coordinated beamforming (CB), coordinated scheduling (CS), coordinated multiple point (CoMP), and the like are used to reduce interference and to support UE mobility. Communications system 500 includes a macro cell 505 and a LPN 510. Communications system 500 also includes a UE 515 that is initially served by macro cell 505. Communications system 500 further includes a MME/SGW/PGW 520. Although shown as a single unit, MME/SGW/PGW 520 may be implemented as multiple units. MME/SGW/PGW 520 may control mobility of UE, provide services to UE, provide an entry point and/or an exit point for packets, and the like. Beyond MME/SGW/PGW 520 is a remainder of a core network. MME/SGW/PGW 520 is coupled to macro cell 505 and LPN 510 by a wired S1 interface, while macro cell 505 and LPN 510 are connected via a wired X2 interface.

Initially, UE 515 is served by macro cell 505. However, as UE 515 moves, it enters the coverage area of LPN 510. If intra-macro HOs are not prevented, UE 515 may participate in a HO to become served by LPN 510. However, since intra-macro HOs are prevented, UE 515 remains served by macro cell 505. But as UE 515 remains in the coverage area of LPN 510, transmissions from LPN 510 (and from UEs served by LPN 310) can cause interference to UE 515.

To help reduce interference and to help improve communications performance, JP, JT, CB, CS, CoMP, and the like are used. At an agreed upon (or specified) network resource(s), both macro cell 505 and LPN 510 transmit to UE 515, which receives and processes the transmissions from macro cell 505 and LPN 510.

Figure 5B:
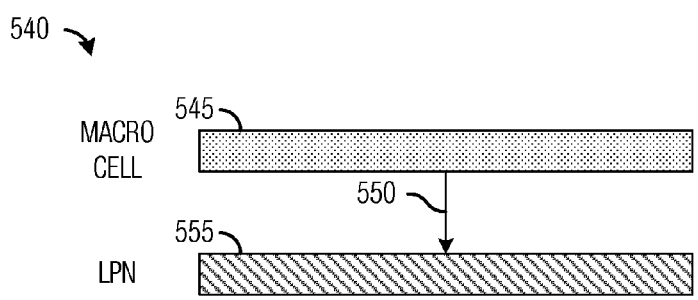
FIG. 5b illustrates an example first transmission diagram associated with FIG. 5a according to example embodiments described herein.

FIG. 5b illustrates a transmission diagram 540. Transmission diagram 540 displays transmission from macro cell 505 (shown as transmission 545) and LPN 510 (shown as transmission 555). During transmission 545, macro cell 505 transmits data that LPN 510 is to transmit to UE 515 to LPN 510. The transmission of the data to LPN 510 occurs over the X2 interface between macro cell 505 and LPN 510.

Figure 5C:
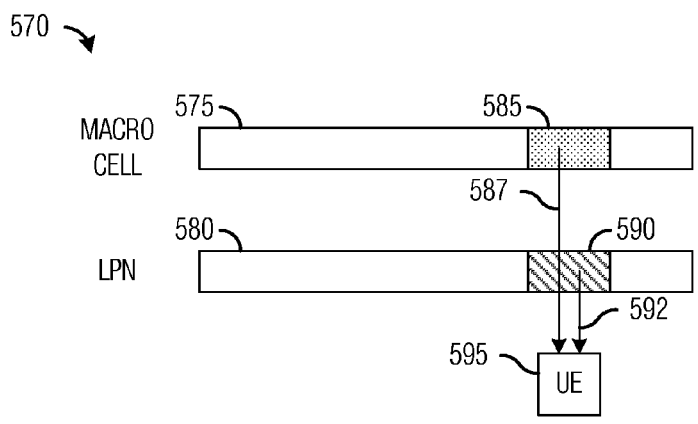
FIG. 5c illustrates an example second transmission diagram associated with FIG. 5a according to example embodiments described herein.

FIG. 5c illustrates a transmission diagram 570. Transmission diagram 570 displays transmissions from macro cell 505 (shown as transmission 575) and LPN 510 (shown as transmission 580). As shown in FIG. 5c, transmission 575 (transmissions from macro cell 505) and transmission 580 (transmissions from LPN 510) have a region (region 585 for macro cell 505 and region 590 for LPN 510) wherein both macro cell 505 and LPN 510 transmit to UE 595. Transmissions from macro cell 505 and LPN 510 may utilize JP, JT, CB, CS, CoMP, and the like. It is noted that the transmission of data to LPN 510 from macro cell 505 occurs prior to the transmissions from macro cell 505 and LPN 510 to UE 595.

Figure 6A:
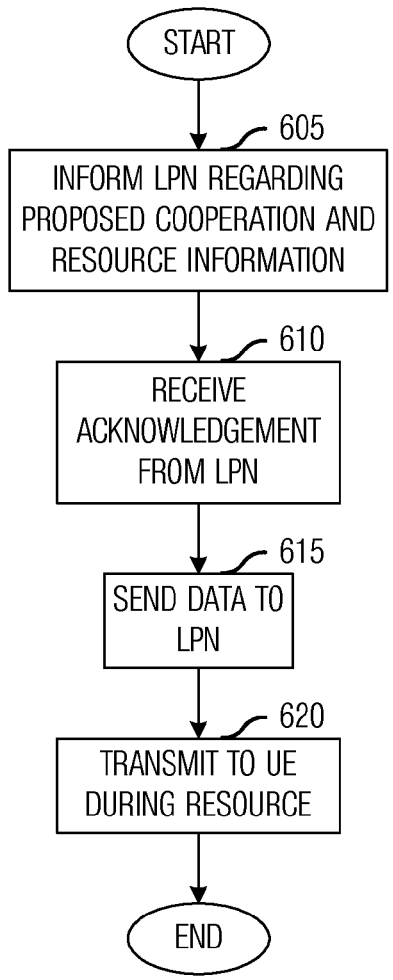
FIG. 6a illustrates an example flow diagram of operations as a macro cell participates to prevent intra-macro HOs and performs JT, JP, CB, CS, CoMP, and the like to reduce interference and to support UE mobility according to example embodiments described herein.

FIG. 6a illustrates a flow diagram of operations 600 as a macro cell participates to prevent intra-macro HOs and performs JT, JP, CB, CS, CoMP, and the like to reduce interference and to support UE mobility. Operations 600 may be indicative of operations occurring in a macro cell, such as macro cell 505, as the macro cell participates to prevent intra-macro HOs and performs JT, JP, CB, CS, CoMP, and the like to reduce interference and to support UE mobility.

Operations 600 begin with the macro cell informing a LPN about a proposed cooperation technique, such as JT, JP, CB, CS, CoMP, and the like, as well as network resource(s) wherein the proposed cooperation technique is to occur (block 605). In other words, the macro cell proposes a cooperation period to the LPN, wherein the macro cell and the LPN cooperate using the proposed cooperation technique to transmit to the UE in the network resources. According to an example embodiment, the macro cell may inform the LPN about network resource(s) occupancy and duration of the proposed cooperation technique.

The macro cell receives an acknowledgement from the LPN (block 610). According to an example embodiment, the macro cell receives an acknowledgement informing the macro cell if the LPN agrees to the proposed cooperation technique over the network resource(s) for the duration. The macro cell and the LPN may exchange multiple messages to negotiate the cooperation technique, the network resource(s), and/or the duration. According to an alternate example embodiment, in a configuration wherein the LPN is operating as a slave to the macro cell and the macro cell makes scheduling and cooperation decisions for the LPN, an acknowledgment from the LPN may not be necessary.

The macro cell sends data to be transmitted to the UE by the LPN to the LPN (block 615). The macro cell may make use of the X2 interface or some other high-speed interface between the macro cell and the LPN to transmit the data to the LPN. The macro cell sends data to the UE during the network resource(s) using the agreed to cooperation technique (block 620).

Figure 6B:
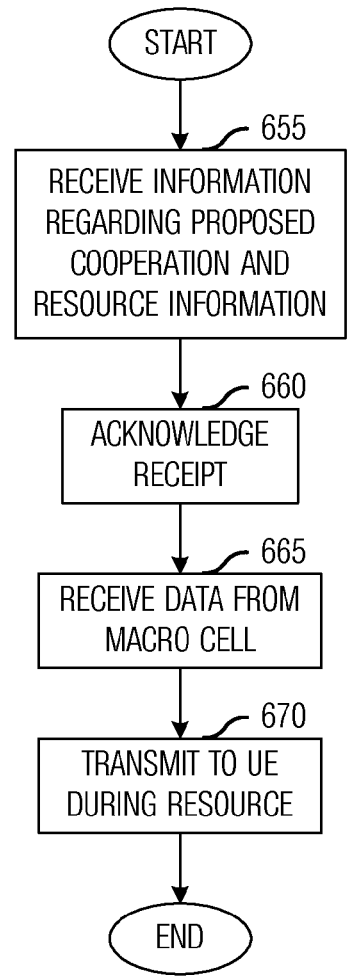
FIG. 6b illustrates an example flow diagram of operations as a LPN participates to prevent intra-macro HOs and performs JT, JP, CB, CS, CoMP, and the like to reduce interference and to support UE mobility according to example embodiments described herein.

FIG. 6b illustrates a flow diagram of operations 650 as a LPN participates to prevent intra-macro HOs and performs JT, JP, CB, CS, CoMP, and the like to reduce interference and to support UE mobility. Operations 650 may be indicative of operations occurring in a LPN, such as LPN 510, as the LPN participates to prevent intra-macro HOs and performs JT, JP, CB, CS, CoMP, and the like to reduce interference and to support UE mobility.

Operations 650 begin with the LPN receiving a transmission informing the LPN about a proposed cooperation technique, such as JT, JP, CB, CS, CoMP, and the like, as well as network resource(s) wherein the proposed cooperation technique is to occur (block 655). According to an example embodiment, the LPN also receives information about network resource(s) occupancy and duration of the proposed cooperation technique.

The LPN sends a transmission acknowledging receipt of the information (block 660). According to an example embodiment, the acknowledgment informs the macro cell if the LPN agrees to the proposed cooperation technique over the network resource(s) for the duration. The LPN and the macro cell may exchange multiple messages to negotiate the cooperation technique, the network resource(s), and the duration. According to an alternate example embodiment, if the LPN is operating as a slave to the macro cell and the macro cell is making scheduling and cooperation decisions for the LPN, then it may not be necessary for the LPN to acknowledge the receipt of the information.

The LPN receives data for the UE from the macro cell (block 665). The data from the macro cell is received over a high-speed interface, such as the X2 interface, between the LPN and the macro cell. The LPN sends the data to the UE during the network resource(s) using the agreed to cooperation technique (block 670).

According to an example embodiment, another technique that can be used to support UE mobility in a Hetnet is to allow inter-macro HO but to reduce their impact on the core network. Generally, the technique is used in situations where the LPN is used for coverage hole filling, where the coverage area of the macro cell is weak or non-existent. The macro cell knows which LPNs to allow HOs to based on coverage information reports, such as neighbor reports.

Figure 7:
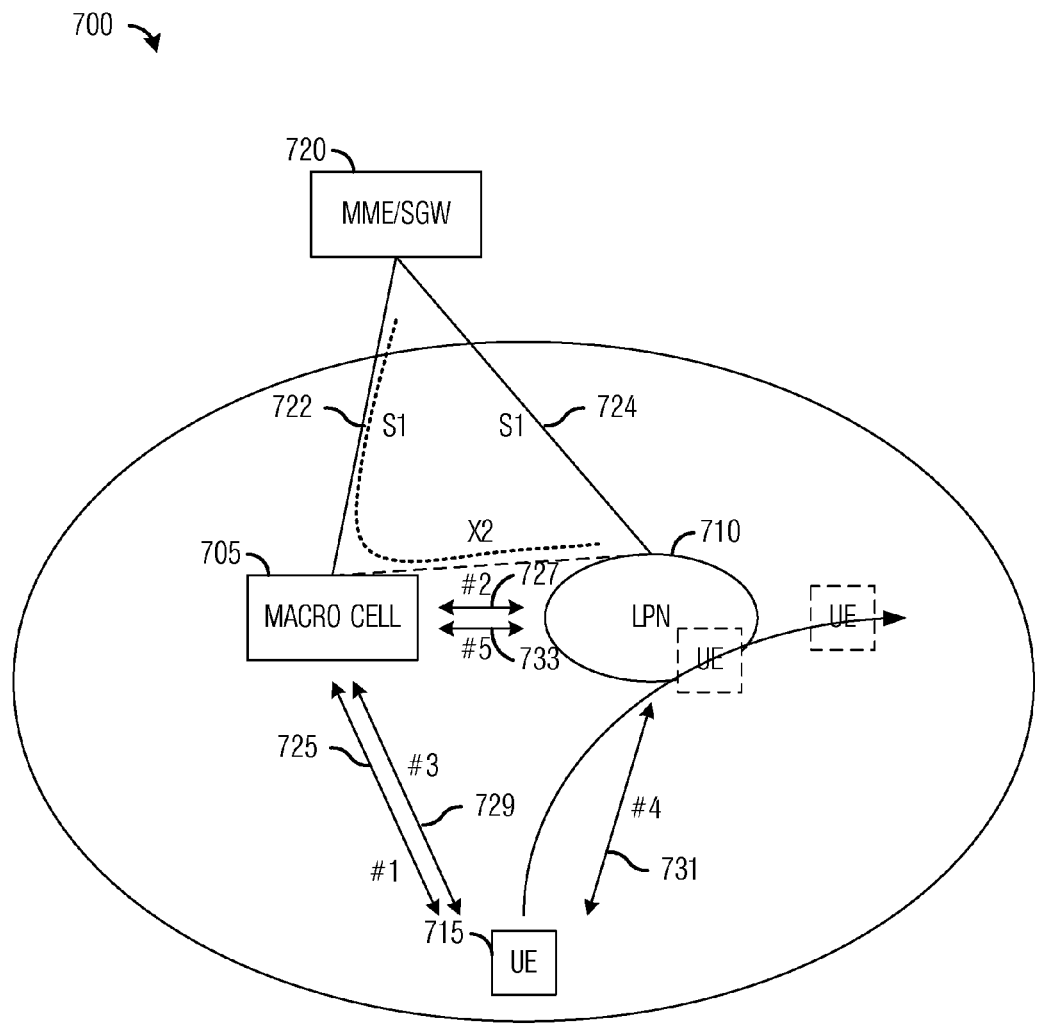
FIG. 7 illustrates an example communications system where intra-macro HOs are permitted with signal path switch delay according to example embodiments described herein.

FIG. 7 illustrates a communications system 700 where intra-macro HOs are permitted with signal path switch delay. Communications system 700 includes a macro cell 705 and a LPN 710. Communications system 700 also includes a UE 715 that is initially served by macro cell 705. Communications system 700 further includes a MME/SGW 720. Although shown as a single unit, MME/SGW 720 may be implemented as multiple units. MME/SGW 720 may control mobility of UE, provide services to UE, and the like. Beyond MME/SGW 720 is a remainder of a core network. MME/SGW 720 is coupled to macro cell 705 and LPN 710 by a wired S1 interface (connections 722 and 724, respectively), while macro cell 705 and LPN 710 are connected via a wired X2 interface.

As UE 715 moves into the coverage area of LPN 710, UE 715 may participate in an intra-macro HO between macro cell 705 and LPN 710. According to an example embodiment, the intra-macro HO is implemented as a convention cellular HO. The intra-macro HO occurs over a number of steps:

Step #1 (line 725): UE 715 sends a measurement report to macro cell 705;

Step #2 (line 727): HO preparation using X2 interface between macro cell 705 and LPN 710, includes HO request with UE context transfer, and etc. Macro cell 705 retains a copy of the UE context in anticipation of a HO of UE 715 back to macro cell 705;

Step #3 (line 729): HO commences between UE 715 and macro cell 705 (as well as LPN 710);

Step #4 (line 731): Access, time advance (TA), and confirmation between UE 715 and LPN 710; and Step #5 (line 733): Sequence number (SN) and data forwarding between macro cell 705 and LPN 710.

After the intra-macro HO completes (after time duration T1), LPN 710 delays triggering of a path switch in the core network to route data for UE 715 to LPN 710 rather than macro cell 705. Therefore, macro cell 705 continues to receive data for UE 715 (instead of in a conventional cellular HO where LPN 710 would receive data for UE 715 from the core network) and forwards the data to LPN 710 for delivery to UE 715.

According to an example embodiment, the triggering of the path switch in the core network is based on a switching threshold, such as timer, that provides a measure of the mobility of UE 715. Although the discussion presented herein focuses on the switching threshold being implemented as a timer set to a specified time value, other switching thresholds may be used. Examples of other switching thresholds include an amount of data sent to UE 715, a number of messages sent to UE 715, measurement reports from UE 715, and the like.

If the mobility of UE 715 is high, then the threshold will help to reduce frequent path switches due to the high mobility. If the mobility of UE 715 is low, then the path switches will not be significantly impacted. As shown in FIG. 7, LPN 710 delays the trigger of the path switch for a time duration $T_{TH}$. If time duration $T_{TH}$ expires and UE 715 is still served by LPN 710, then the path switch is triggered. If time duration $T_{TH}$ expires and UE 715 is served by macro cell 705, then the path switch is not triggered. The duration of the timer (with duration $T_{TH}$) may be set based on an expected mobility of UEs, available resources at macro cell 705, available resources at the core network, available resources at LPN 710, and the like.

In order to avoid a redundant path switch for UE 715 from LPN 710 to macro cell 705, macro cell will keep the context for UE 715 for an extended period of time, generally longer than in a conventional cellular HO. In order to ensure in-order deliver of data to UE 715, macro cell 705 inserts a marker, such as an END marker packet, upon receiving a HO request from LPN 710.

Until the path switch is triggered by LPN 710, MME/SGW 720 (and the core network) remains unaware of changes in access node serving UE 715. Therefore, if UE 715 changes back to macro cell 705, MME/SGW 720 (and the core network) may not even know that an intra-macro HO ever occurred.

Figure 8A:
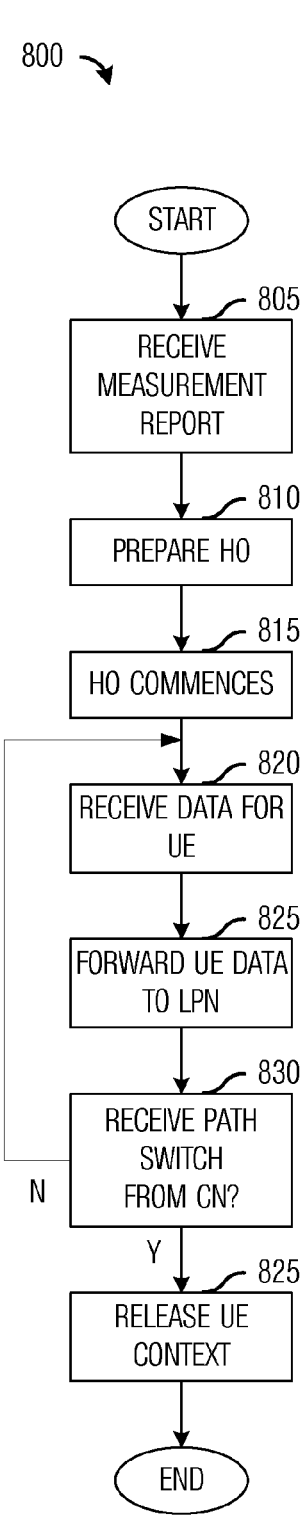
FIG. 8a illustrates an example flow diagram of operations as a macro cell participates in intra-macro HOs with signal path switch delay to support UE mobility according to example embodiments described herein.

FIG. 8a illustrates a flow diagram of operations 800 as a macro cell participates in intra-macro HOs with signal path switch delay to support UE mobility. Operations 800 may be indicative of operations occurring in a macro cell, such as macro cell 705, as the macro cell participates in intra-macro HOs with signal path switch delay to support UE mobility.

Operations 800 begin with the macro cell receiving a measurement report, such as a received signal strength report, from a UE (block 805). The measurement report indicates that the UE is moving into the coverage area of a LPN and triggers an intra-macro HO. The macro cell prepares the intra-macro HO (block 810). The macro cell communicates with the LPN over the X2 interface to request the intra-macro HO.

Once the intra-macro HO is prepared, the intra-macro HO commences and completes (block 815). The macro cell continues to receive data for the UE since the LPN has not triggered the path switch (block 820) and forwards the received data to the LPN, which in turn transmits the data to the UE (block 825).

The macro cell performs a check to determine if it has received a path switch notification or a path switch indication from a core network (block 830). If the macro cell has not received the path switch notification (or the path switch indication) from the core network, then the macro cell returns to block 820 to receive additional data for the UE and forward the additional data to the LPN. If the macro cell has received the path switch notification (or the path switch indication) from the core network, then the macro cell may release the UE context (block 835). According to an example embodiment, the macro cell may hold on to the UE context for a specified amount of time prior to releasing it in case the UE performs a HO back to the macro cell.

Figure 8B:
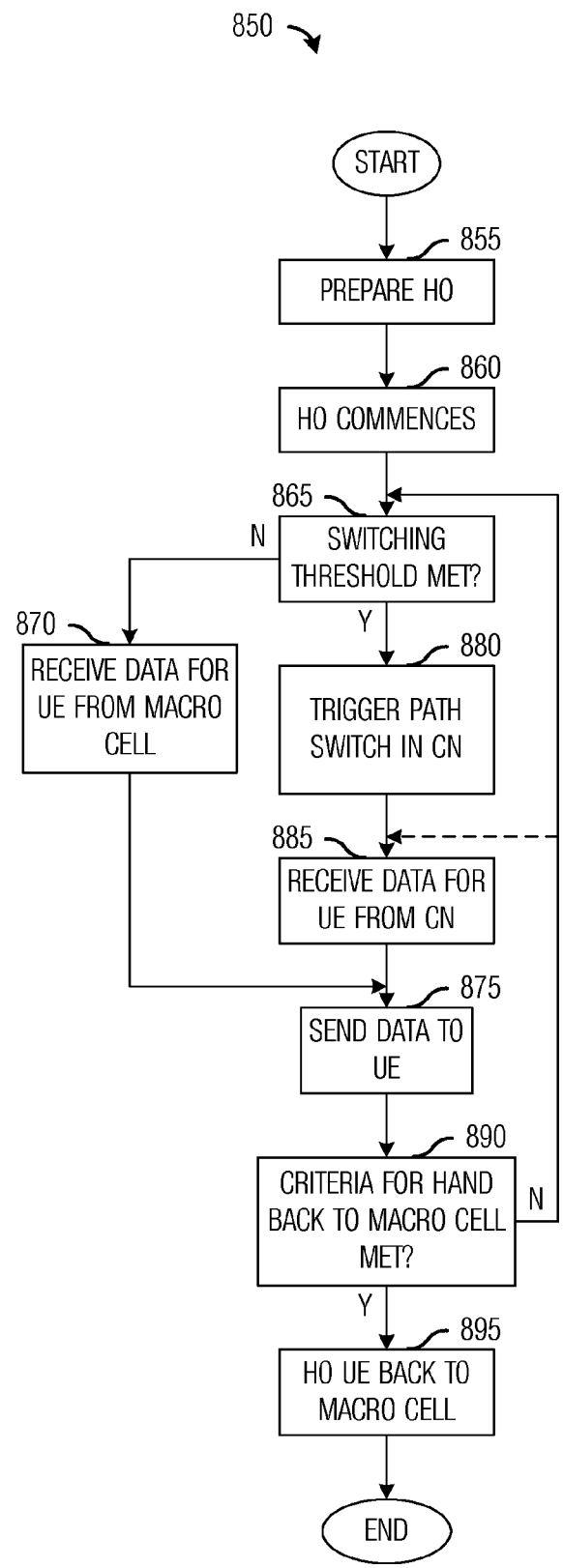
FIG. 8b illustrates an example flow diagram of operations as a LPN participates in intra-macro HOs with signal path switch delay to support UE mobility according to example embodiments described herein.

FIG. 8b illustrates a flow diagram of operations 850 as a LPN participates in intra-macro HOs with signal path switch delay to support UE mobility. Operations 850 may be indicative of operations occurring in a LPN, such as LPN 710, as the LPN participates in intra-macro HOs with signal path switch delay to support UE mobility.

Operations 850 begin with the LPN preparing for the intra-macro HO (block 855). In preparing for the intra-macro HO, the LPN communicates with a macro cell over the X2 interface and responds to the macro cell's request for the intra-macro HO. Once the intra-macro HO is prepared, the intra-macro HO commences and completes (block 860).

The LPN performs a check to determine if the switching threshold is met (block 865). If the switching threshold is not met, then the LPN leaves the signal path connecting the core network to the macro cell and the LPN continues to receive data for the UE from the macro cell (block 870). The LPN sends the data to the UE (block 875).

If the switching threshold is met, then the LPN triggers the signal path switch connecting the core network to the LPN rather than the macro cell (block 880). With the path switch completed, the LPN receives data intended for the UE directly from the core network (block 885) and sends the received data to the UE (block 875).

The LPN performs a check to determine if criteria for a hand back (a HO of the UE from the LPN back to the macro cell) is met (block 890). According to an example embodiment, a handback may occur as the UE continues to move around and moves out of the coverage area of the LPN and back into the coverage area of the macro cell. As an example, referencing back to FIG. 2, considering the situation wherein as UE 210 moves along path 220. While UE 210 is in the coverage area of LPN 215, it is served by LPN 215. However, as it moves out of the coverage area of LPN 215, UE 210 participates in a hand back and returns to being served by macro cell 205. Examples of the criteria for a hand back include measurement reports from the UE, mobility estimates for the UE, and the like Reference back to FIG. 8b, if the criteria for the hand back is not met, the LPN returns to block 865 to determine if the switching threshold is met (if the signal path switch has not already occurred) or to block 885 if the signal path switch has already occurred. While, if the criteria for the hand back is met, the LPN participates in the hand back and performs a HO to return the UE back to the macro cell (block 895).

Figure 9:
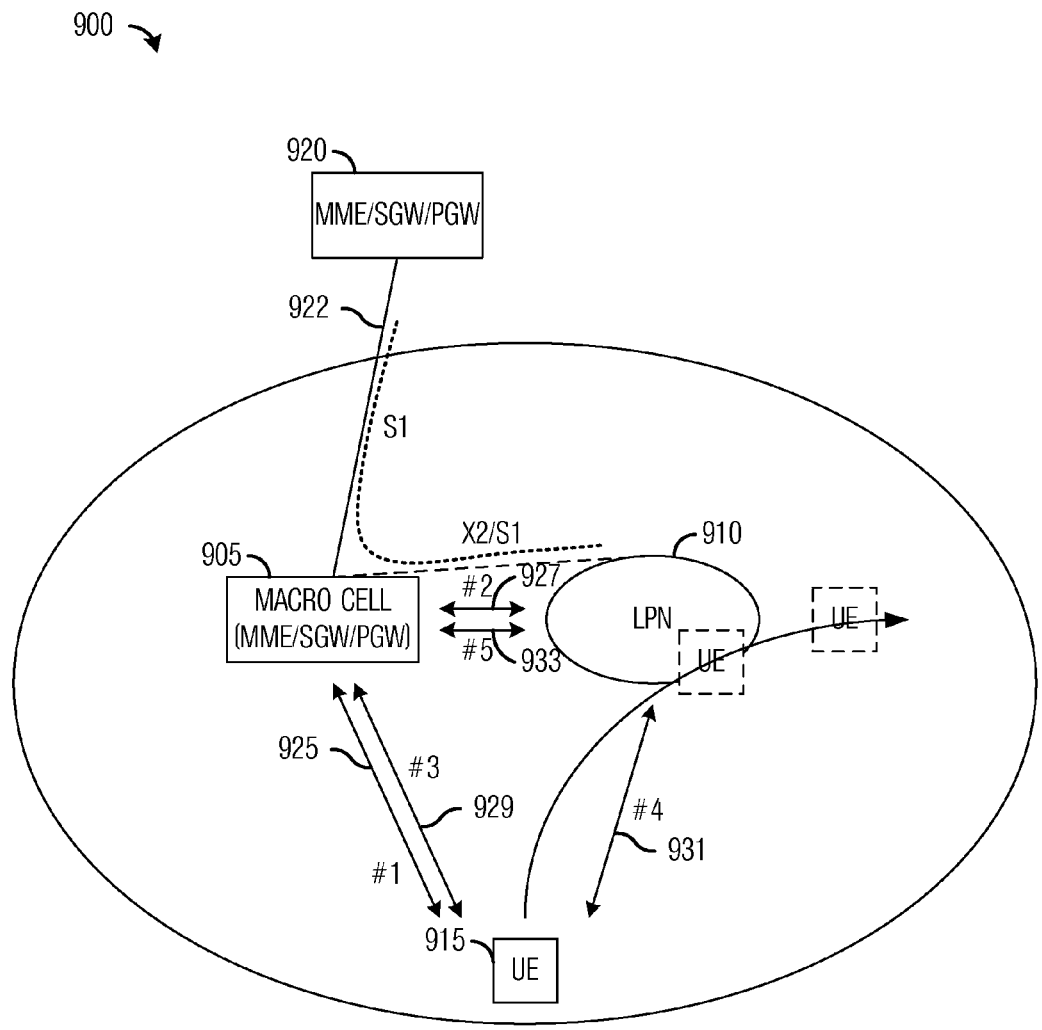
FIG. 9 illustrates an example communications system wherein intra-macro HOs are permitted with a subnet architecture support for UE mobility according to example embodiments described herein.

FIG. 9 illustrates a communications system 900 wherein intra-macro HOs are supported with a subnet architecture support for UE mobility. Communications system 900 includes a macro cell 905 and a LPN 910. Communications system 900 also includes a UE 915 that is initially served by macro cell 905. Communications system 900 further includes a MME/SGW/PGW 920. Although shown as a single unit, MME/SGW/PGW 920 may be implemented as multiple units. MME/SGW 920 may control mobility of UE, provide services to UE, provide an entry point and/or an exit point for packets, and the like. Beyond MME/SGW/PGW 920 is a remainder of a core network. MME/SGW/PGW 920 is coupled to macro cell 905 by a wired S1 interface (connection 922), while macro cell 905 and LPN 910 are connected via a wired X2 interface. Communications between MME/SGW/PGW 920 and LPN 910 go through macro cell 905.

However, to reduce impact on the core network, macro cell 905 implements MME/SGW/PGW functionality for devices operating in its coverage area. Macro cell 905 implements a subnet architecture in communications system 900, i.e., communications to and from devices operating in the coverage area of macro cell 905 pass through macro cell 905. As UE 915 moves into the coverage area of LPN 910, UE 915 may participate in an intra-macro HO between macro cell 905 and LPN 910. According to an example embodiment, the intra-macro HO is implemented as a convention cellular HO. The intra-macro HO occurs over a number of steps:

Step #1 (line 925): UE 915 sends a measurement report to macro cell 905;

Step #2 (line 927): HO preparation using X2 interface between macro cell 905 and LPN 910, includes HO request with UE context transfer, and etc.;

Step #3 (line 929): HO commences between UE 915 and macro cell 905 (as well as LPN 910);

Step #4 (line 931): Access, time advance (TA), and confirmation between UE 915 and LPN 910; and Step #5 (line 933): Sequence number (SN) and data forwarding between macro cell 905 and LPN 910.

After the intra-macro HO completes (after time duration T1), LPN 910 receives data for UE 915 from macro cell 905 instead of directly from MME/SGW/PGW 920. Therefore, the intra-macro HO is transparent to MME/SGW/PGW 920 (and the core network). Should UE 915 participate in intra-macro HOs back to macro cell 905 or other LPNs operating within the coverage area of macro cell, MME/SGW/PGW 920 (and the core network) remains unaware of changes in access node serving UE 915.

Figures 10A, 10B:
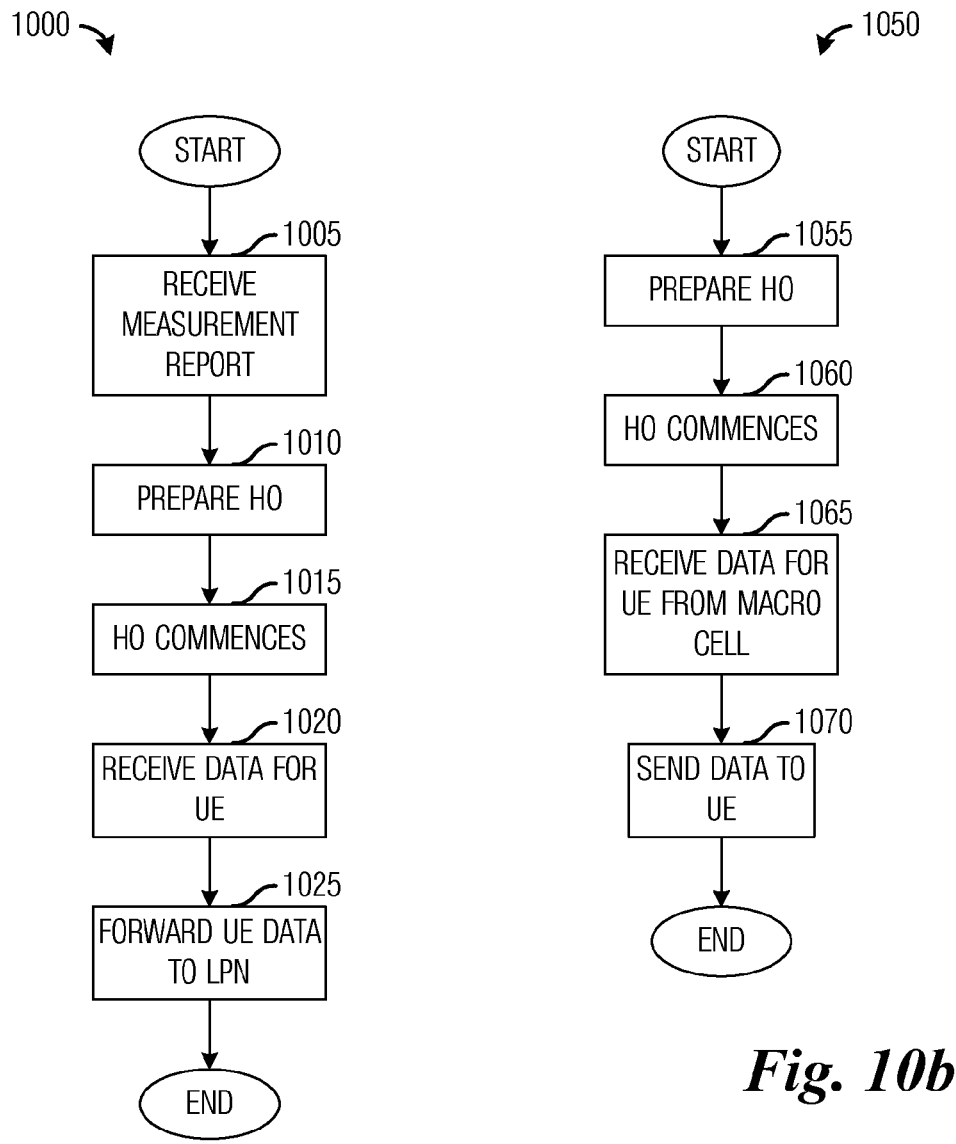
FIG. 10a illustrates an example flow diagram of operations as a macro cell participates in intra-macro HOs with a subnet architecture support for UE mobility according to example embodiments described herein.
FIG. 10b illustrates an example flow diagram of operations as a LPN participates in intra-macro HOs with a subnet architecture support for UE mobility according to example embodiments described herein.

FIG. 10a illustrates a flow diagram of operations 1000 as a macro cell participates in intra-macro HOs with a subnet architecture support for UE mobility. Operations 1000 may be indicative of operations occurring in a macro cell, such as macro cell 905, as the macro cell participates in intra-macro HOs with a subnet architecture support for UE mobility.

Operations 1000 begin with the macro cell receiving a measurement report, such as a received signal strength report, from a UE (block 1005). The measurement report indicates that the UE is moving into the coverage area of a LPN and triggers an intra-macro HO. The macro cell prepares the intra-macro HO (block 1010). The macro cell communicates with the LPN over the X2 interface to request the intra-macro HO.

Once the intra-macro HO is prepared, the intra-macro HO commences and completes (block 1015). The macro cell continues to receive data for the UE since the macro cell serves as a SGW for LPNs operating within its coverage area (block 820) and forwards the received data to the UE (block 1025).

FIG. 10b illustrates a flow diagram of operations 1050 as a LPN participates in intra-macro HOs with a subnet architecture support for UE mobility. Operations 1050 may be indicative of operations occurring in a LPN, such as LPN 910, as the LPN participates in intra-macro HOs with a subnet architecture support for UE mobility.

Operations 1050 begin with the LPN preparing for the intra-macro HO (block 1055). In preparing for the intra-macro HO, the LPN communicates with a macro cell over the X2 interface and responds to the macro cell's request for the intra-macro HO. Once the intra-macro HO is prepared, the intra-macro HO commences and completes (block 1060). The LPN receives data for the UE from the macro cell (block 1065). The LPN sends the data to the UE (block 1070).

Figure 11A:
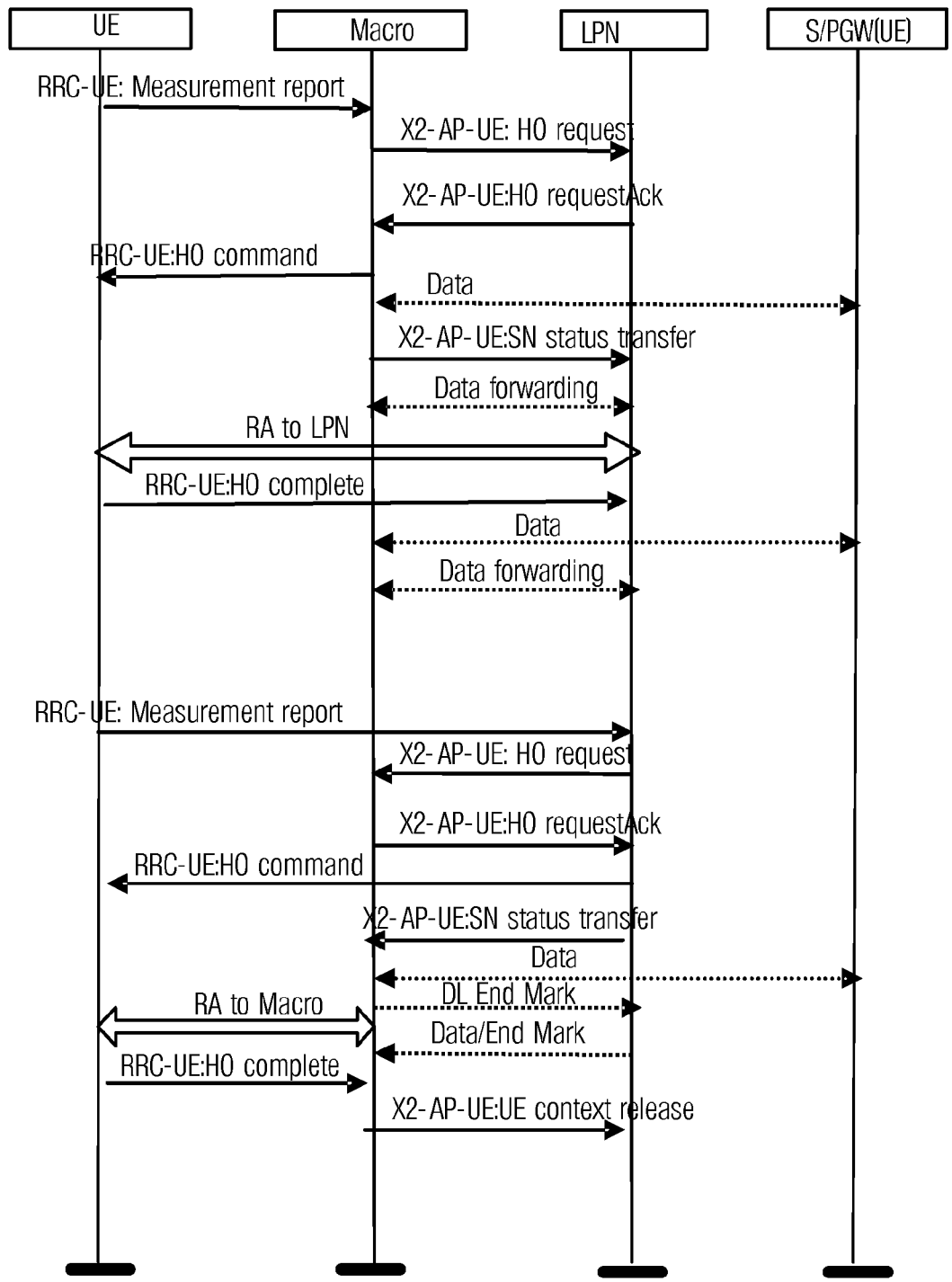
FIG. 11a illustrates an example message exchange in an intra-macro HO as shown in FIG. 7 or FIG. 9 according to example embodiments described herein.

FIG. 11a illustrates a message exchange in an intra-macro HO as shown in FIG. 7 or FIG. 9. As shown in FIG. 11a, there is no path switch between MME/SGW/PGW to macro cell to MME/SGW/PGW to LPN as in a conventional cellular HO. The message exchange of FIG. 11a may correspond either to the intra-macro HO of FIG. 9, where the macro cell operates as a SGW/PGW for LPNs deployed within its coverage area, or the intra-macro HO with path switch delay of FIG. 7, but where the UE is handed back (i.e., a hand back is performed) from the LPN to the macro cell, before the switching threshold was met at the LPN.

Figure 11B:
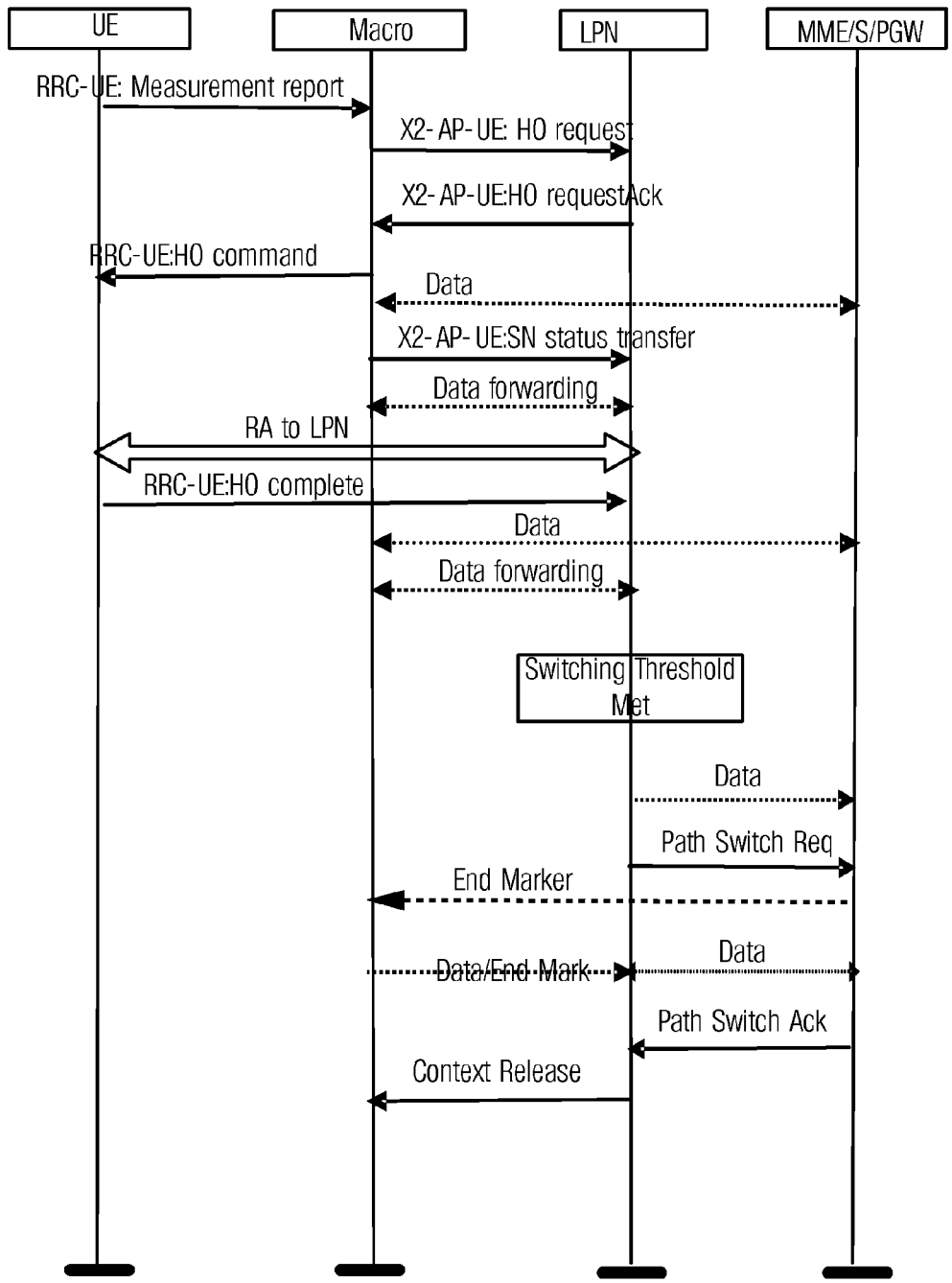
FIG. 11b illustrates an example message exchange in an intra-macro HO with path switch delay as shown in FIG. 7, where the switching threshold is met at the LPN and the path switch is performed according to example embodiments described herein.

FIG. 11b illustrates a message exchange in the case of an intra-macro HO with path switch delay as shown in FIG. 7, where the switching threshold is met at the LPN and the path switch is performed. It is noted that in this case, the LPN triggers the path switch towards the CN, and the message exchange continues as per a typical HO.

As discussed previously, some Hetnet deployments include relay nodes (RNs), which appear as access nodes to UEs but receive their bandwidth (i.e., network resources) from donor macro cells. Hence receive signaling from the donor macro cells indicating their allocation of network resources. RNs generally have lower transmit power levels than the donor macro cells. Typically, RNs listen for transmissions from their donor macro cells and/or their UEs during specific network resources. Therefore, the RNs usually will not transmit during these specific network resources.

Although the discussion focuses on the transmission of data, the example embodiments presented herein are operable for the transmission of control information as well. In general, the term information is used to refer to data, control information, or both. Therefore, the discussion of the transmission of data should not be construed as being limiting to either the scope or the spirit of the example embodiments.

FIG. 12a illustrates a communications system 1200 wherein a RN is operating as a LPN and is operating in a JT mode with a macro cell. As shown in FIG. 12a, a macro cell 1202 is transmitting data intended for a UE to a RN 1202 at time T1 and then at time T2, both macro cell 1202 and RN 1202 are transmitting to the UE. FIG. 12b illustrates a transmission diagram 1210 of the JT mode.

FIG. 12c illustrates a communications system 1220 wherein a RN is operating as a LPN and is not transmitting in a reserved network resource to reduce interference to a UE. As shown in FIG. 12c, a macro cell 1222 is transmitting data to a UE at time T1, while a RN is not transmitting to reduce interference to the UE. FIG. 12d illustrates a transmission diagram 1230 of the RN avoiding transmitting in the reserved network resource. It is noted that when dealing with RNs, one or more resources are dedicated for use as a backhaul resource and during the backhaul resource, the RN does not transmit and macro cell 1222 can transmit directly to the UE without necessarily having to specify the reserved network resource, as shown in FIG. 12*d*.

FIG. 12*e* illustrates a communications system 1240 wherein a RN is operating as a LPN and is operating in a CB or CS mode with a macro cell. As shown in FIG. 12*e*, a macro cell 1242 and a RN 1244 are transmitting to different UEs at time T1. The transmissions from macro cell 1242 and RN 1244 may be beamformed and/or scheduled in a coordinated fashion so that they can occur at the same time or substantially the same time without causing significant interference to each other. FIG. 12*f* illustrates a transmission diagram 1250 of the CB or CS mode.

According to an example embodiment, a selection of a technique to be used to provide UE mobility support may be made on an individualized basis for each UE depending on any of a number of support factors, which include but are not limited to: UE mobility (e.g., speed, movement pattern, and the like), type of application executing on the UE (e.g., latency critical applications, throughput critical applications, delay critical applications, and the like), channel condition, traffic load of involved cells and/or nodes (e.g., macro cell, donor macro cell, LPN, and the like), backhaul connectivity between involved cells and/or nodes (e.g., availability and/or bandwidth of backhaul (such as S1, X2, and the like) connectivity), intended use of LPN (e.g., capacity boosting, enhancing HO, coverage enhancement, and the like), and the like.

According to another example embodiment, the selection of a technique to be used to provide UE mobility support may be made on a macro cell or a donor macro cell basis for all UE operating within the coverage area of the macro cell or the donor macro cell based on any of a number of support factors. The technique can be selected at communications system initiation, communications system reset, at specified times, at specified periodicity, upon occurrence of an event (e.g., receiving a technique selection message, a HO count meeting a HO threshold, a HO failure rate meeting a failure threshold, an error rate meeting an error threshold, a measured latency meeting a latency threshold, a measured data rate meeting a data threshold, and the like), and the like. According to another example embodiment, the technique to be used may be specified by a technical standard, an operator of the communications system, and the like.

Figures 13A, 13B:
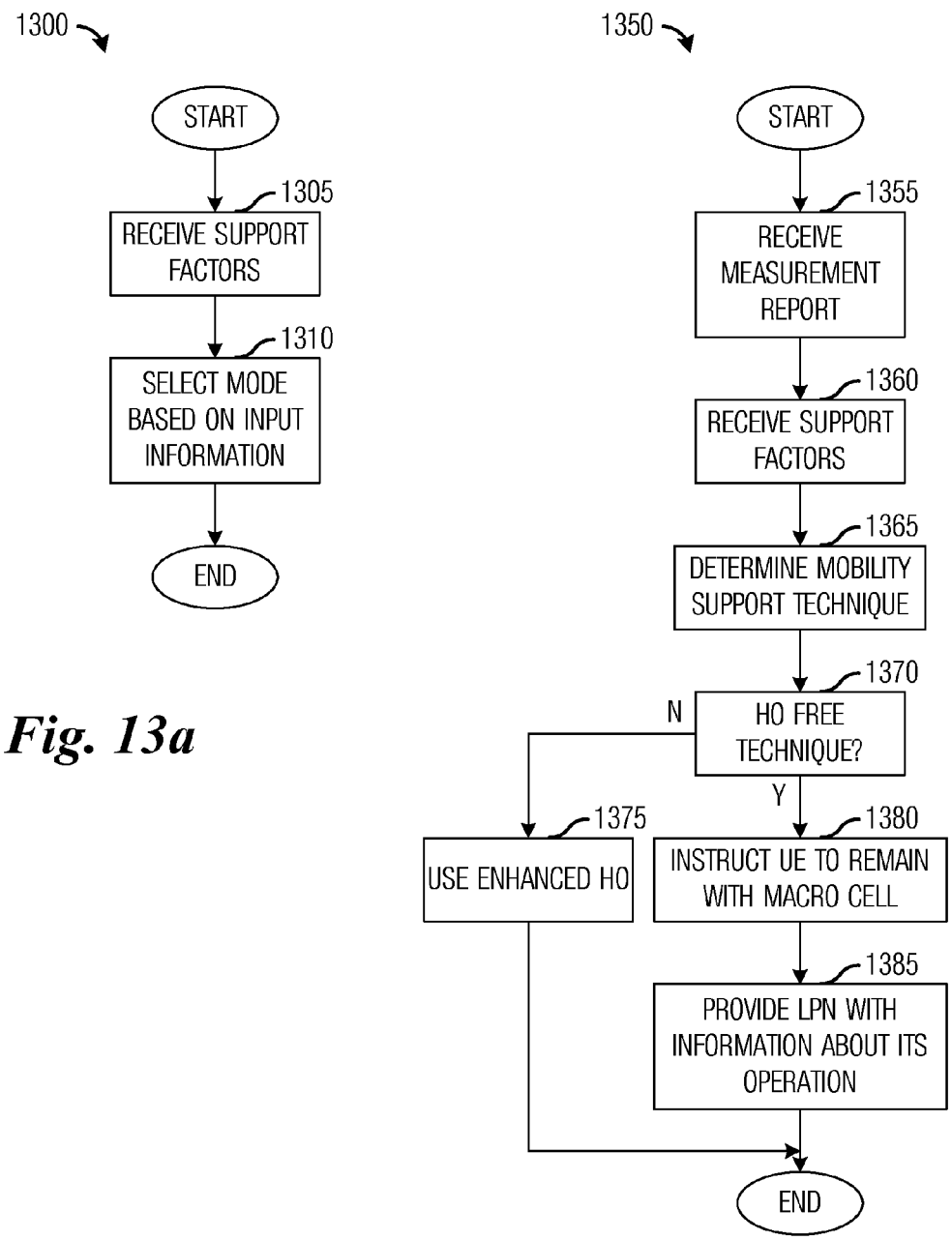
FIG. 13a illustrates an example flow diagram of operation in selecting a technique for providing UE mobility support according to example embodiments described herein.
FIG. 13b illustrates an example flow diagram of operations in an example selection of a technique for providing UE mobility support according to example embodiments described herein.

FIG. 13*a* illustrates a flow diagram of operation 1300 in selecting a technique for providing UE mobility support. Operations 1300 may be indicative of operations occurring in a device, such as a macro cell, a donor macro cell, an entity in a core network (such as a MME, SGW, PGW, and the like) responsible for selecting the technique for providing UE mobility support, and the like. Operations 1300 may occur at each instance when conditions indicate that an intra-macro HO is warranted, at specified times, at specified periodicities, and the like. The discussion of operations 1300 focuses on a macro cell performing operations 1300, however, operations 1300 may be performed at other devices (e.g., a donor macro cell, an entity in a core network, and the like). Therefore, the discussion of operations 1300 being performed by a macro cell should not be construed as being limiting to either the scope or the spirit of the example embodiments.

Operations 1300 begin with a macro cell receiving support factors (block 1305). As discussed previously, support factors may include but are not limited to: UE mobility (e.g., speed, movement pattern, and the like), type of application executing on the UE (e.g., latency critical applications, throughput critical applications, and the like), channel condition, traffic load of involved cells and/or nodes (e.g., macro cell, donor macro cell, LPN, and the like), backhaul connectivity between involved cells and/or nodes (e.g., availability and/or bandwidth of backhaul (such as S1, X2, and the like) connectivity), and the like.

The macro cell selects a technique to provide UE mobility support based on one or more of the support factors (block 1310). As an example, considering a scenario wherein a UE executing a delay sensitive application moves into a coverage area of a LPN. The macro cell selects an interference free technique, such as illustrated in FIGS. 3*a* and 3*b*, if the LPN was intended for use as a capacity boosting LPN. While, if the LPN was intended for use to fill a coverage hole of the macro cell, then the macro cell selects an enhanced HO technique (e.g., the enhanced HO techniques illustrated in FIGS. 7 and 9). Similarly, if the LPN was intended for use in enhancing general coverage, the macro cell selects a HO free JP and/or JT technique (e.g., the techniques illustrated in FIGS. 5*a* through 5*c*).

In addition to utilizing the intended use of the LPN and the application executing on the UE, the macro cell may make use of other support factors to differentiate between different techniques. As an example, the macro cell makes use of UE measurement reports to differentiate between the different techniques. UE measurement reports, such as reference signal received power (RSRP) reports, associated with the macro cell as well as those associated with the LPN, may be used to differentiate between the different techniques. Furthermore, differences in UE measurement reports associated with the macro cell and the LPN, and the like are usable by the macro cell to differentiate between different techniques.

FIG. 13*b* illustrates a flow diagram of operations 1350 in an example selection of a technique for providing UE mobility support. Operations 1300 may be indicative of operations occurring in device, such as a macro cell, a donor macro cell, an entity in a core network (such as a MME, SGW, PGW, and the like) responsible for selecting the technique for providing UE mobility support, and the like.

Operations 1350 begins with a device, such as a macro cell, a donor macro cell, an entity in a core network, and the like, receiving a measurement report from a UE (block 1355). As discussed previously, the measurement report may be in the form of a RSRP measurement report from the UE. The device also receives support factors, which include but are not limited to: UE mobility (e.g., speed, movement pattern, and the like), type of application executing on the UE (e.g., latency critical applications, throughput critical applications, delay critical applications, and the like), channel condition, traffic load of involved cells and/or nodes (e.g., macro cell, donor macro cell, LPN, and the like), backhaul connectivity between involved cells and/or nodes (e.g., availability and/or bandwidth of backhaul (such as S1, X2, and the like) connectivity), intended use of LPN (e.g., capacity boosting, enhancing HO, coverage enhancement, and the like), and the like (block 1360).

The device determines a UE mobility support technique using the measurement report and the support factors (block 1365) and performs a check to determine if the UE mobility support technique is a HO free technique (block 1370). If the UE mobility support technique is not a HO free technique, then the device makes use of enhanced intra-macro HO techniques, such as those illustrated in FIGS. 7 and 9) (block 1375).

If the UE mobility support technique is a HO free technique, then the device may instruct the UE to remain connected through the macro cell (block 1380). The device may send a specific instruction to the UE or the device may prohibit a HO from taking place. The device also sends information to the LPN regarding reserved network resource(s), duration of reservation, transmit power level, and the like if the LPN is to stop transmissions (or transmit at only low power levels) during the reserved network resource(s) or reserved network resource(s), duration of reservation, cooperation information, scheduler information, and the like if the LPN is to cooperate with the device in transmitting to the UE (block 1385).

Generally, inter-cell interference coordination (ICIC) is a communications technique that partitions available frequency and/or time resources and assigns different parts to different cells to reduce interference between nearby cells. The example embodiments presented herein are operable with a communications system that utilizes ICIC to reduce interference. As an example, the UE may be scheduled in high power region of the macro cell, which corresponds to a low power region of a LPN. As another example, considering a situation wherein the macro cell is operating as a subnet controller, then a UE is initially associated with the macro cell or a LPN. The macro cell then adjusts the frequency of the intra-macro HO of a UE and keeps the UE with the macro cell rather than performing the intra-macro HO if the HO frequency is higher than a threshold.

Figure 14:
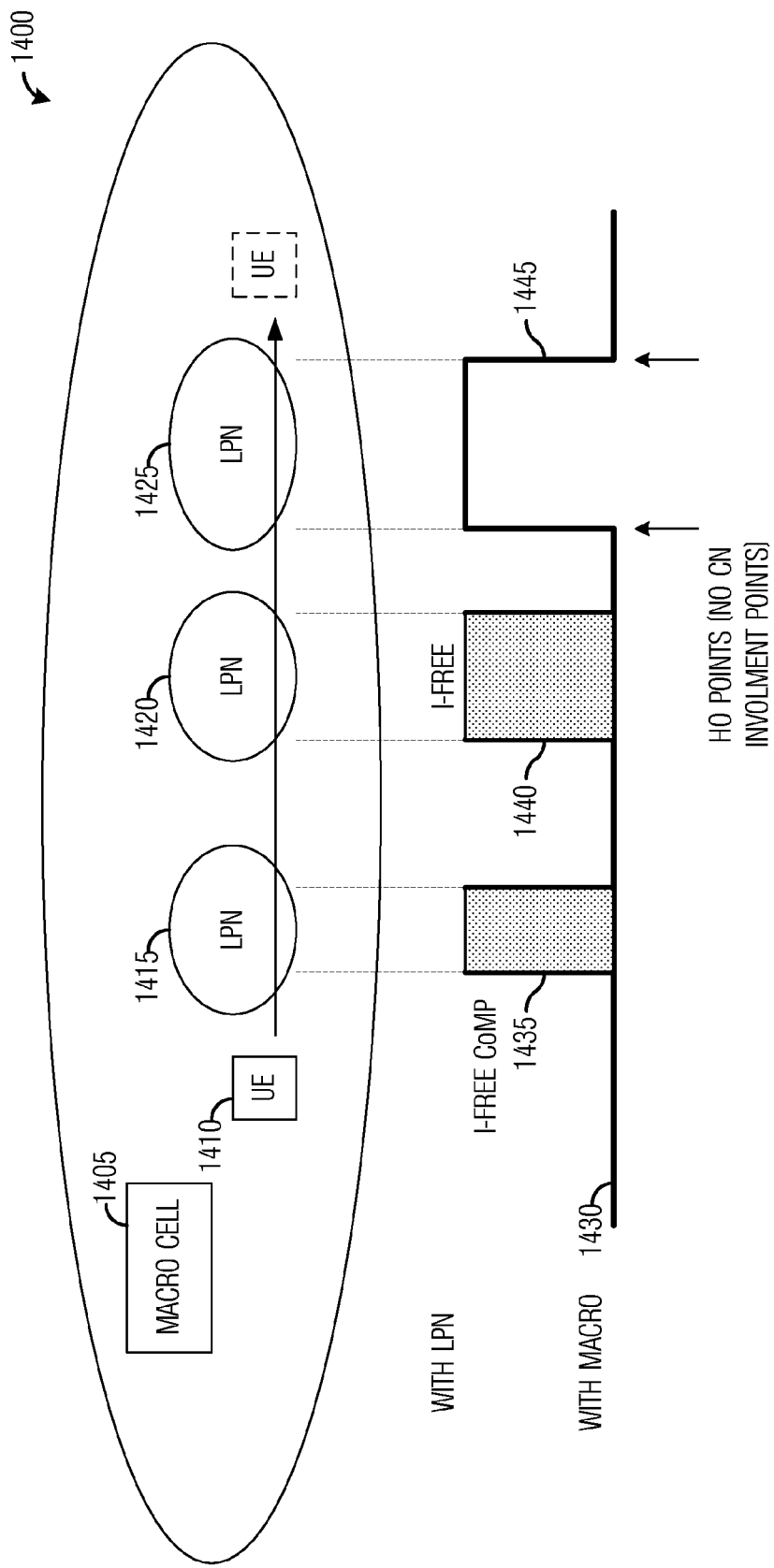
FIG. 14 illustrates an example communications system highlighting techniques for supporting UE mobility according to example embodiments described herein.

FIG. 14 illustrates a communications system 1400 highlighting techniques for supporting UE mobility. Communications system 1400 includes a macro cell 1405 and a UE 1410 initially served by macro cell 1405. As UE 1410 moves, it passes through coverage areas of LPN 1415, LPN 1420, and LPN 1425. In order to support UE mobility, macro cell 1405 determines techniques for supporting UE mobility based on measurement reports from UE 1410 as well as support factors.

Trace 1430 displays example techniques for UE mobility support as selected by macro cell 1405. With LPN 1415, which is located relatively close to macro cell 1405 (and hence UE 1410 is experiencing a high strength signal from macro cell 1405), the macro cell 1405 selects an interference free technique wherein both macro cell 1405 and LPN 1415 are cooperating (i.e., JT, JP, CB, CS, CoMP, and the like) to transmit to UE 1410. With LPN 1420, which is located further away from macro cell 1405 than LPN 1415, the macro cell 1405 selects an interference free technique wherein only macro cell 1405 transmits to UE 1410 during a reserved network resource(s) while LPN 1420 remains silent or transmits at a low power level. With LPN 1425, which is located far away from macro cell 1405 (and hence UE 1410 is experience a low strength signal from macro cell 1405), the macro cell 1405 selects an enhanced HO technique and performs an intra-macro HO with LPN 1425.

Figure 15:
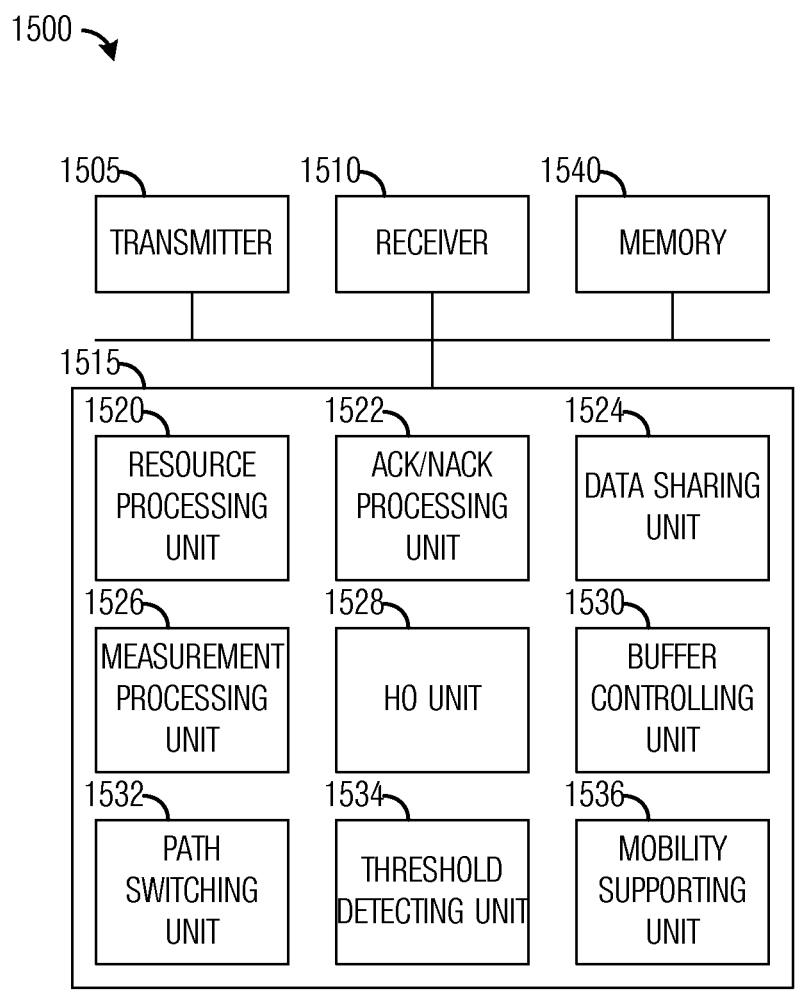
FIG. 15 illustrates an example communications device according to example embodiments described herein.

FIG. 15 provides an illustration of a communications device 1500. Communications device 1500 may be an implementation of a macro cell, a donor macro cell, a relay node, a LPN, and the like. Communications device 1500 may be used to implement various ones of the embodiments discussed herein. As shown in FIG. 15, a transmitter 1505 is configured to send packets and a receiver 1510 is configured to receive packets. Transmitter 1505 and receiver 1510 may have a wireless interface, a wireline interface, or a combination thereof.

A resource processing unit 1520 is configured to reserve network resource(s) for interference free operation. Resource processing unit 1520 is also configured to negotiate the reservation of the network resource(s), a duration, a transmit power level, a cooperation mode (i.e., JT, JP, CB, CS, CoMP, and the like), and the like. An acknowledgement (ACK)/negative acknowledgement (NACK) processing unit 1522 is configured to process an acknowledgement received from another communications device, such as a LPN, to determine if the other communications device has agreed to the reservation of the network resource(s), the duration of the reservation, the transmit power level, the cooperation mode, and the like. A data sharing unit 1524 is configured to send data to the other communications device in situations wherein the other communications device is also transmitting, such as in JT, JP, CB, CS, CoMP, and the like.

A measurement processing unit 1526 is configured to process measurement reports from devices, such as UEs, served by communications device 1500. A HO unit 1528 is configured to initiate HOs for devices served by communications device 1500. A buffer controlling unit 1530 is configured to buffer data received for devices served by communications device 1500 as long as communications device 1500 continues to receive data for the devices. Buffer controlling unit 1530 is also configured to ensure in-order delivery of data by inserting an end marker at the end of its buffered data for the device.

A path switching unit 1532 is configured to switch a path at a core network based on path switching threshold. A threshold detecting unit 1534 is configured to determine if the path switching threshold is met. A mobility supporting unit 1536 is configured to select a technique for supporting UE mobility based on the measurement reports and support factors. A memory 1540 is configured to store reserved network resource(s) information, reservation information, cooperation information, measurement reports, data, path switching thresholds, techniques for supporting UE mobility, support factors, and the like.

The elements of communications device 1500 may be implemented as specific hardware logic blocks. In an alternative, the elements of communications device 1500 may be implemented as software executing in a processor, controller, application specific integrated circuit, and the like. In yet another alternative, the elements of communications device 1500 may be implemented as a combination of software and/or hardware.

As an example, transmitter 1505 and receiver 1510 may be implemented as a specific hardware block, while resource processing unit 1520, ACK/NAC processing unit 1522, data sharing unit 1524, measurement processing unit 1526, HO unit 1528, buffer controlling unit 1530, path switching unit 1532, threshold detecting unit 1534, and mobility supporting unit 1536 may be software modules executing in a processor 1515, a microprocessor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for supporting mobility in a heterogeneous network, the method comprising:
   establishing a wireless link between a user equipment and a macro cell;
   receiving, by a macro cell, a measurement report from the user equipment when the user equipment migrates into range of a low power node, the low power node being located within a coverage area of the macro cell; and
   selecting a cooperation technique for reducing interference in the heterogeneous network in accordance with the measurement report and a support factor, wherein the cooperation technique requires the low power node to transmit at a reduced power level over network resources reserved for carrying transmissions between the user equipment and the macro cell, and wherein the support factor includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof.

2. The method of claim 1, wherein receiving a measurement report comprises receiving a reference signal received power report from the user equipment.

3. The method of claim 1, wherein the cooperation technique comprises an interference free technique.

4. The method of claim 3, further comprising:
reserving the network resources for carrying communications over the wireless link between the user equipment and the macro cell; and
notifying the low power node that the network resources have been reserved for carrying communications over the wireless link between the user equipment and the macro cell.

5. The method of claim 3, wherein the cooperation technique prohibits the low power node from performing wireless transmissions over the network resources reserved for carrying transmissions between the user equipment and the macro cell.

6. A method for reducing interference in a heterogeneous network, the method comprising:
establishing a cooperation technique between a macro cell and a low power node for communicating data to a user equipment in the heterogeneous network when the user equipment migrates into range of a low power node, wherein the low power node is located within a coverage area of the macro cell, and wherein the cooperation technique is configured to be selected in accordance with a support factor that includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof; and
transmitting at least a first subset of data to the user equipment over a network resource in accordance with the cooperation technique, wherein the cooperation technique requires the macro cell and the low power node to perform joint transmissions, joint processing, coordinated beamforming, coordinated scheduling, or coordinated multiple point (CoMP) transmissions when communicating data to the user equipment.

7. The method of claim 6, wherein the cooperation technique specifies a no transmit period during which the low power node is prohibited from performing wireless transmissions over the network resource or a low transmit power period during which the low power node is required to transmit at a reduced power level over the network resource.

8. The method of claim 7, wherein the low power node is operating in a high signal strength portion of the coverage area of the macro cell and is being used as a capacity boost.

9. The method of claim 6, wherein the method further comprises:
sending, by the macro cell, a second subset of data to the low power node over a backhaul network, wherein the first subset of data and the second subset of data are portions of the data to be communicated to the user equipment in accordance with the cooperation technique.

10. The method of claim 9, wherein the cooperating technique requires the low power node to wirelessly transmit the second subset of data to the user equipment.

11. The method of claim 9, wherein sending the second subset of data comprises sending the second subset of data over a wireline connection of a backhaul network.

12. The method of claim 9, wherein the cooperation technique requires the macro cell and the low power node to perform a joint transmission when communicating the data to the user equipment in the heterogeneous network.

13. The method of claim 9, wherein the cooperation technique requires the macro cell and the low power node to perform coordinated beamforming when communicating the data to the user equipment in the heterogeneous network.

14. The method of claim 9, wherein the cooperation technique requires the macro cell and the low power node to perform coordinated multiple point (CoMP) transmissions when communicating the data to the user equipment in the heterogeneous network.

15. The method of claim 6, wherein the cooperation technique requires the macro cell and the low power node to perform joint processing when communicating the data to the user equipment in the heterogeneous network.

16. The method of claim 6, wherein the cooperation technique requires the macro cell and the low power node to perform coordinated scheduling when communicating the data to the user equipment in the heterogeneous network.

17. The method of claim 6, wherein the method further comprises:
sending, by the macro cell, the first subset of data to the low power node over a backhaul network, wherein the cooperation technique requires the macro cell and the low power node to jointly transmit the first subset of data to the user equipment over the network resources.

18. A macro cell comprising:
a processor; and
a non-transitory computer readable storage medium storing programming for execution by the processor, the programming including instructions to:
establish a cooperation technique between the macro cell and a low power node for communicating data to a user equipment in a heterogeneous network when the user equipment migrates into range of the low power node, wherein the low power node is located within a coverage area of the macro cell, and wherein the cooperation technique is configured to be selected in accordance with a support factor that includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof; and
transmit at least a first subset of data to the user equipment over a network resource in accordance with the cooperation technique, wherein the cooperation technique requires the macro cell and the low power node to perform a joint transmission technique, a joint processing technique, a coordinated beamforming technique, coordinated scheduling, or a coordinated multiple point (CoMP) transmission when communicating data to the user equipment.

19. The macro cell of claim 18, wherein the programming further includes instructions to:
communicate a second subset of data to the low power node over a backhaul network, wherein the first subset of data and the second subset of data are portions of the data to be communicated to the user equipment in accordance with the cooperation technique.

20. The macro cell of claim 19, wherein the cooperation technique requires the low power node to wirelessly transmit the second subset of data to the user equipment.

21. The macro cell of claim 19, wherein sending the second subset of data comprises sending the second subset of data over a wireline connection of a backhaul network.

22. The macro cell of claim 18, wherein the cooperation technique requires the macro cell and the low power node to perform a joint transmission when communicating the data to the user equipment in the heterogeneous network.

23. The macro cell of claim 18, wherein the cooperation technique requires the macro cell and the low power node to perform coordinated beamforming when communicating the data to the user equipment in the heterogeneous network.

24. The macro cell of claim 18, wherein the cooperation technique requires the macro cell and the low power node to perform coordinated multiple point (CoMP) transmissions when communicating the data to the user equipment in the heterogeneous network.

25. The macro cell of claim 18, wherein the cooperation technique requires the macro cell and the low power node to perform joint processing when communicating the data to the user equipment in the heterogeneous network.

26. The macro cell of claim 18, wherein the cooperation technique requires the macro cell and the low power node to perform coordinated scheduling when communicating the data to the user equipment in the heterogeneous network.

27. The macro cell of claim 18, wherein the programming further includes instructions to:
send the first subset of data to the low power node over a backhaul network, wherein the cooperation technique requires the macro cell and the low power node to jointly transmit the first subset of data to the user equipment over the network resources.

28. An apparatus comprising:
a processor; and
a non-transitory computer readable storage medium storing programming for execution by the processor, the programming including instructions to:
establish a wireless link between a user equipment and a macro cell in a heterogeneous network;
receive a measurement report from the user equipment when the user equipment migrates into range of a low power node, the low power node being located within a coverage area of the macro cell; and
selecting a cooperation technique for reducing interference in the heterogeneous network in accordance with the measurement report and a support factor, wherein the cooperation technique requires the low power node to transmit at a reduced power level over network resources reserved for carrying transmissions between the user equipment and the macro cell, and wherein the support factor includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof.

29. The apparatus of claim 28, wherein the cooperation technique prohibits the low power node from performing wireless transmissions over the network resources reserved for carrying transmissions between the user equipment and the macro cell.

30. A method for reducing interference in a heterogeneous network, the method comprising
establishing, by a low power node, a cooperation technique with a macro cell when a user equipment migrates into range of the low power node, wherein the low power node is located within a coverage area of the macro cell, wherein the cooperation technique is configured to be selected in accordance with a support factor that includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof; and
communicating, by the low power node, data to one or more receivers in accordance with the cooperation technique.

31. The method of claim 30, wherein communicating data to the one or more receivers in accordance with the cooperation technique comprises:
performing, by the low power node, transmissions at a reduced power level over network resources reserved for carrying transmissions between the user equipment and the macro cell.

32. The method of claim 30, wherein the cooperation technique comprises a joint transmission technique, a joint processing technique, a coordinated beamforming technique, a coordinated scheduling technique, a coordinated multiple point (CoMP) transmission technique, or combinations thereof.

33. A low power node comprising:
a processor; and
a non-transitory computer readable storage medium storing programming for execution by the processor, the programming including instructions to:
establish a cooperation technique between the low power node and a macro cell when a user equipment migrates into range of the low power node, wherein the low power node is located within a coverage area of the macro cell, and wherein the cooperation technique is configured to be selected in accordance with a support factor that includes user equipment mobility information, type of application executing on the user equipment, condition of a channel between the user equipment and the macro cell, traffic load of the macro cell, traffic load of the low power node, backhaul connectivity between the macro cell and the low power node, an intended use of the low power node, or a combination thereof; and
communicate data to one or more receivers in accordance with the cooperation technique.

34. The low power node of claim 33, wherein the instructions to communicate data to one or more receivers in accordance with the cooperation technique include instructions to:
perform transmissions at a reduced power level over network resources reserved for carrying transmissions between the user equipment and the macro cell.

35. The low power node of claim 33, wherein the cooperation technique comprises a joint transmission technique, a joint processing technique, a coordinated beamforming technique, a coordinated scheduling technique, a coordinated multiple point (CoMP) transmission technique, or combinations thereof.

* * * * *